US006285278B1

(12) United States Patent
Schutt et al.

(10) Patent No.: US 6,285,278 B1
(45) Date of Patent: Sep. 4, 2001

(54) ELECTRONIC SYSTEM FOR MONITORING A FIFTH WHEEL HITCH

(75) Inventors: Randy L. Schutt; Steven C. Dupay, both of Holland; Michael H. Ginocchio, Grand Haven, all of MI (US)

(73) Assignee: Holland Hitch Company, Holland, MI (US)

( * ) Notice: Subject to any disclaimer, the term of this patent is extended or adjusted under 35 U.S.C. 154(b) by 0 days.

(21) Appl. No.: 09/493,534

(22) Filed: Jan. 28, 2000

(51) Int. Cl.[7] .................................................... G08B 21/00

(52) U.S. Cl. .................. 340/431; 340/686.2; 340/686.6; 280/435; 280/DIG. 14

(58) Field of Search ................................ 340/431, 686.1, 340/686.2, 686.6, 687, 689; 307/9.1; 280/433, 434, 435, 477, DIG. 14, 441.2

(56) References Cited

U.S. PATENT DOCUMENTS 2,982,566 5/1961 Geerds ................................ 280/435
3,013,815 12/1961 Geerds ................................ 280/435
3,535,679 10/1970 Connors .............................. 340/431
3,640,549 2/1972 Neff et al. ........................... 280/435
3,697,974 10/1972 Harris et al. ......................... 340/431
3,868,127 2/1975 Marulic et al. ...................... 280/434
4,258,421 3/1981 Juhasz et al. .......................... 701/35
4,428,595 1/1984 Martin et al. ........................ 280/435
4,614,355 9/1986 Koch ................................ 280/438.1
4,649,369 3/1987 Walker et al. ....................... 340/438
4,669,748 6/1987 LeVee .............................. 280/423.1
4,685,695 * 8/1987 LeVee .............................. 280/441.2
4,809,177 2/1989 Windle et al. ........................... 701/1
5,108,123 4/1992 Rubenzik ............................ 280/477
5,456,484 10/1995 Fontaine .............................. 280/434
5,477,207 12/1995 Frame, Sr. et al. .................. 340/431
5,506,773 4/1996 Takaba et al. ....................... 340/438
5,549,166 * 8/1996 Orbach et al. ........................... 172/4
5,583,770 12/1996 Sekido et al. ........................ 340/438
5,696,676 12/1997 Takaba ................................ 340/438
5,757,645 5/1998 Schneider et al. ..................... 701/29
5,861,802 1/1999 Hungerink et al. .................. 340/431
5,917,408 6/1999 Cardillo et al. ...................... 340/439
5,964,813 10/1999 Ishii et al. ............................. 701/35
6,100,794 8/2000 Hillier ................................. 340/431

FOREIGN PATENT DOCUMENTS 3018905 11/1980 (DE) .
3604185 8/1987 (DE) .
3803931 8/1989 (DE) .
4013672 10/1991 (DE) .
19820139 11/1999 (DE) .

OTHER PUBLICATIONS

Dieter Raab, "Remote Control of Fifth Wheel Couplings", Truck Technology International, 1990 (4 Pages).
Truck Tech advertisement, "Convertible–Jaw Fifthwheel Senses Kingpin," Nov. 1991, page 151.

* cited by examiner

*Primary Examiner*—Van T. Trieu
(74) *Attorney, Agent, or Firm*—Price, Heneveld, Cooper, DeWitt & Litton

(57) ABSTRACT

An electronic system monitors a trailer hitch assembly that has a hitch plate with a throat for receiving a kingpin of a trailer and a locking mechanism for locking the kingpin in throat. The system determines whether the trailer hitch assembly is properly coupled to the trailer and includes a trailer sensor, a lock sensor, and a control circuit. The trailer sensor senses the position of the trailer relative to the trailer hitch assembly and the lock sensor senses the position of the locking mechanism. The control circuit is coupled to the trailer sensor and the lock sensor. The control circuit determines whether the trailer hitch assembly is properly coupled to the trailer by taking into account the sequence in which the trailer sensor and the lock sensor sense the respective positions of the trailer and the locking mechanism, as well as, the time periods elapsing between the sensing at such positions.

30 Claims, 21 Drawing Sheets

200
H
START VEHICLE 202
APPLY PCB POWER 210
SET ATTEMPT=0 212
SET TIMER=0 INCREMENT ATTEMPT 214
START TIMER 216
218 N NO KINGPIN AND LOCK OPEN? Y
A
220 NO KINGPIN AND LOCK OPEN? Y N
B
224 N TIMER > 1024? Y
228 DEACTIVATE INDICATOR
226 ACTIVATE INDICATOR

B
KINGPIN PRESENT AND LOCK OPEN?
232
Y
N
C
SET TIMER=0
234
START TIMER
236
KINGPIN PRESENT AND LOCK OPEN?
238
Y
N
ACTIVATE INDICATOR
242
TIMER > 1?
244
Y
N
F
KINGPIN PRESENT AND LOCK CLOSED?
246
Y
N
E
D

A
248
KINGPIN PRESENT AND LOCK CLOSED?
Y
N
G
250
NO KINGPIN AND LOCK CLOSED?
Y
N
252
PROVIDE ERROR CODE AND ACTIVATE INDICATOR
256
NO KINGPIN AND LOCK OPEN?
Y
N
259
PROVIDE ERROR CODE AND ACTIVATE INDICATOR
261
NO KINGPIN AND LOCK OPEN?
Y
N
H

E
KINGPIN PRESENT AND LOCK CLOSED?
260
Y
N
TIMER > 60?
262
Y
N
G
ACTIVATE INDICATOR
266
SET ATTEMPT=0
268
DEACTIVATE INDICATOR
270
NO KINGPIN AND LOCK CLOSED?
272
Y
N
I
SET TIMER2=0
274
START TIMER2
275
M
TIMER2 > 5?
276
Y
N
J
LOCK OPEN?
278
Y
N
K
L

D
ATTEMPT=1
284
Y
N
PROVIDE ERROR CODE AND ACTIVATE INDICATOR
286
NO KINGPIN AND LOCK OPEN?
288
Y
N
PROVIDE ERROR CODE AND ACTIVATE INDICATOR
290
NO KINGPIN AND LOCK OPEN?
292
Y
N
H
F
PROVIDE ERROR CODE AND ACTIVATE INDICATOR
280
NO KINGPIN AND LOCK OPEN?
282
Y
N

B
TILT LEVEL, NO KINGPIN, AND LOCK OPEN?
432
Y
N
C
TILT LEVEL, NO KINGPIN, AND LOCK OPEN?
434
Y
N
ACTIVATE INDICATOR
438
TILT LEVEL, KINGPIN PRESENT AND LOCK OPEN?
440
Y
N
D
SET TIMER =0
442
START TIMER
444
TILT LEVEL, KINGPIN PRESENT AND LOCK OPEN?
446
Y
N
E
ACTIVATE INDICATOR
450
TIMER > 1?
452
Y
N
F

A
454
TILT LEVEL, KINGPIN PRESENT AND LOCK CLOSED?
Y
G
N
456
TILT LEVEL, NO KINGPIN AND LOCK OPEN?
Y
N
458
TILT LEVEL, NO KINGPIN AND LOCK CLOSED?
N
O
Y
460
PROVIDE ERROR CODE AND ACTIVATE INDICATOR
462
TILT DOWN, NO KINGPIN AND LOCK OPEN?
Y
N
H
463
PROVIDE ERROR CODE AND ACTIVATE INDICATOR
465
TILT DOWN, NO KINGPIN AND LOCK OPEN?
Y
N

D
ATTEMPT=1?
514
Y
N
516
PROVIDE ERROR CODE AND ACTIVATE INDICATOR
518
TILT DOWN, NO KINGPIN AND LOCK OPEN?
Y
N
520
PROVIDE ERROR CODE AND ACTIVATE INDICATOR
522
TILT DOWN, NO KINGPIN AND LOCK OPEN?
Y
N
H
F
510
PROVIDE ERROR CODE AND ACTIVATE INDICATOR
512
TILT DOWN, NO KINGPIN AND LOCK OPEN?
Y
N

K
LOCK OPEN?
532
Y
N
PROVIDE ERROR CODE AND ACTIVATE INDICATOR
534
TILT DOWN, NO KINGPIN AND LOCK OPEN?
536
Y
N
H
TIMER > 60?
538
Y
N
DEACTIVATE INDICATOR
540
ACTIVATE INDICATOR
546
TILT LEVEL, KINGPIN PRESENT AND LOCK CLOSED?
548
Y
N
L
P

I
550
ATTEMPT=1?
Y
N
552
NO KINGPIN?
Y
N
554
PROVIDE ERROR CODE AND ACTIVATE INDICATOR
556
TILT DOWN, NO KINGPIN AND LOCK OPEN?
558
PROVIDE ERROR CODE AND ACTIVATE INDICATOR
560
TILT DOWN, NO KINGPIN AND LOCK OPEN?
562
PROVIDE ERROR CODE AND ACTIVATE INDICATOR
564
TILT DOWN, NO KINGPIN AND LOCK OPEN?
H

ELECTRONIC SYSTEM FOR MONITORING A FIFTH WHEEL HITCH

BACKGROUND OF THE INVENTION

The present invention is directed to an electronic system for monitoring the coupling of a trailer to a trailer hitch assembly that is mounted on a truck chassis and more specifically, to an electronic system that indicates whether the trailer is properly coupled to the trailer hitch assembly.

An electronic coupling control system for a vehicle trailer hitch assembly is described in U.S. Pat. No. 5,861,802, entitled "FIFTH WHEEL HITCH COUPLING CONTROL SYSTEM" to Hungerink et al. U.S. Pat. No. 5,861,802 is assigned to the assignee of the present invention and is hereby incorporated by reference. U.S. Pat. No. 5,861,802 discloses an electronic coupling control system that includes a trailer proximity sensor for sensing when a trailer is in the proximity of the hitch assembly, a kingpin sensor for sensing the presence of a trailer kingpin in a hitch plate throat and a lock sensor for sensing when the locking mechanism is locked in a secured position.

U.S. Pat. No. 5,861,802 also discloses an indicator located within the vehicle for providing trailer hitch assembly coupling status information to a driver of the vehicle. A control circuit is coupled to the trailer proximity sensor, the kingpin sensor, the lock sensor and the indicator. These sensors are utilized by the control circuit to inform a driver when a trailer is in close proximity to the trailer hitch assembly, when the trailer kingpin is positioned in the hitch throat and when the locking mechanism is in a locked position. The electronic coupling control system also includes an interface for coupling a control input, of an electrical control system of the vehicle, to the electronic coupling control system. The electronic coupling control system is also capable of performing various self-diagnostic routines to ensure proper operation of the system, when the vehicle ignition is turned on.

While U.S. Pat. No. 5,861,802 advantageously provided some information to an operator of a vehicle, an electronic control coupling system that reliably provides additional information to a vehicle operator, while the vehicle is coupled to a trailer during normal operation, is desirable.

SUMMARY OF THE INVENTION

An embodiment of the present invention is directed to an electronic system for monitoring a trailer hitch assembly. The trailer hitch assembly has a hitch plate with a throat for receiving a kingpin of a trailer and a locking mechanism for locking the kingpin in the throat. The system determines whether the trailer hitch assembly is properly coupled to the trailer and includes a trailer sensor, a lock sensor and a control circuit. The trailer sensor senses the position of the trailer relative to the trailer hitch assembly. The lock sensor senses the position of the locking mechanism. The control circuit is coupled to the trailer sensor and the lock sensor. The control circuit determines whether the trailer hitch assembly is properly coupled to the trailer by taking into account the sequence in which the trailer sensor and the lock sensor sense the respective positions of the trailer and locking mechanism, as well as, the time periods elapsing between the sensing of such positions.

In one embodiment, the trailer sensor is a kingpin sensor that senses the position of the kingpin relative to the throat. In another embodiment, the trailer sensor is a tilt sensor that senses the tilt of the hitch plate. In yet another embodiment, the trailer sensor includes a kingpin sensor that senses the position of the kingpin relative to the throat and a tilt sensor that senses the tilt of the hitch plate. In yet another embodiment, a display device is coupled to the control circuit for providing coupling status information to the driver of the vehicle. The coupling status information includes an error code indicating possible sources of a coupling malfunction.

These and other features, advantages and objects of the present invention will be further understood and appreciated by those skilled in the art by reference to the following specification, claims and appended drawings.

DETAILED DESCRIPTION OF PREFERRED EMBODIMENTS

The present invention is directed to an electronic system that monitors a trailer hitch assembly that includes a hitch plate with a throat for receiving a kingpin of a trailer and a locking mechanism for locking the kingpin in the throat. A control circuit of the system determines whether the trailer hitch assembly is properly coupled to the trailer by monitoring a trailer sensor and a lock sensor. The trailer sensor senses the position of the trailer relative to the trailer hitch assembly. The lock sensor senses the position of the locking mechanism. The control circuit determines whether the trailer hitch assembly is properly coupled to the trailer by taking into account the sequence in which the trailer sensor and the lock sensor sense the respective positions of the trailer and locking mechanism, as well as, the time periods elapsing between the sensing of such positions.

Figure 1A:
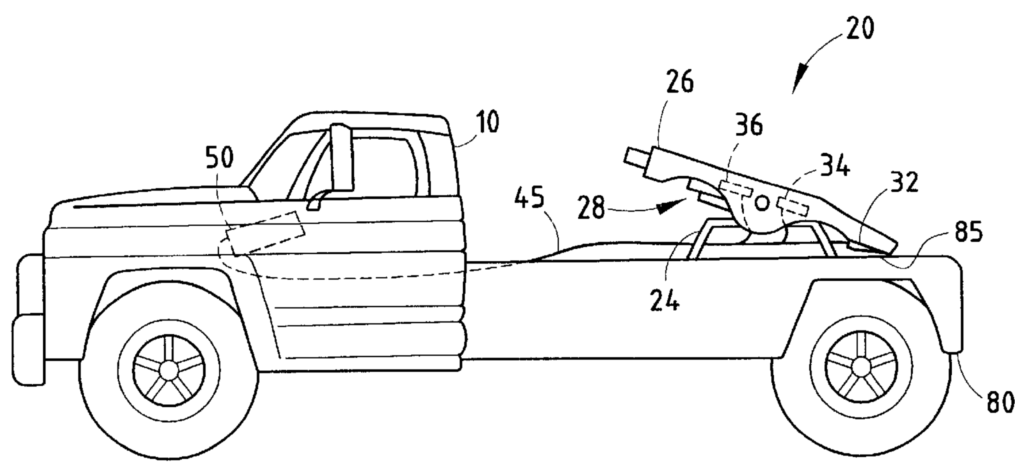
FIG. 1A is a drawing of a truck tractor including an electronic system for monitoring a trailer hitch assembly, according to an embodiment of the present invention.

FIG. 1A shows a truck tractor 10 which includes a trailer hitch assembly 20 having a base 24 securely mounted to a chassis 80, a trailer hitch plate 26 pivotally mounted on base 24 on a transverse axis and a locking mechanism 28 for locking a conventional trailer kingpin in place. The electronic system of the present invention preferably includes three proximity sensors mounted to hitch assembly 20 and an output device 50 mounted in the cab of tractor 10. These sensors are coupled to output device 50 by a multi-conductor cable 45. In a preferred embodiment, the three sensors mounted to trailer hitch assembly 20 include a tilt sensor 32, a kingpin sensor 34 and a lock sensor 36.

Figure 1B:
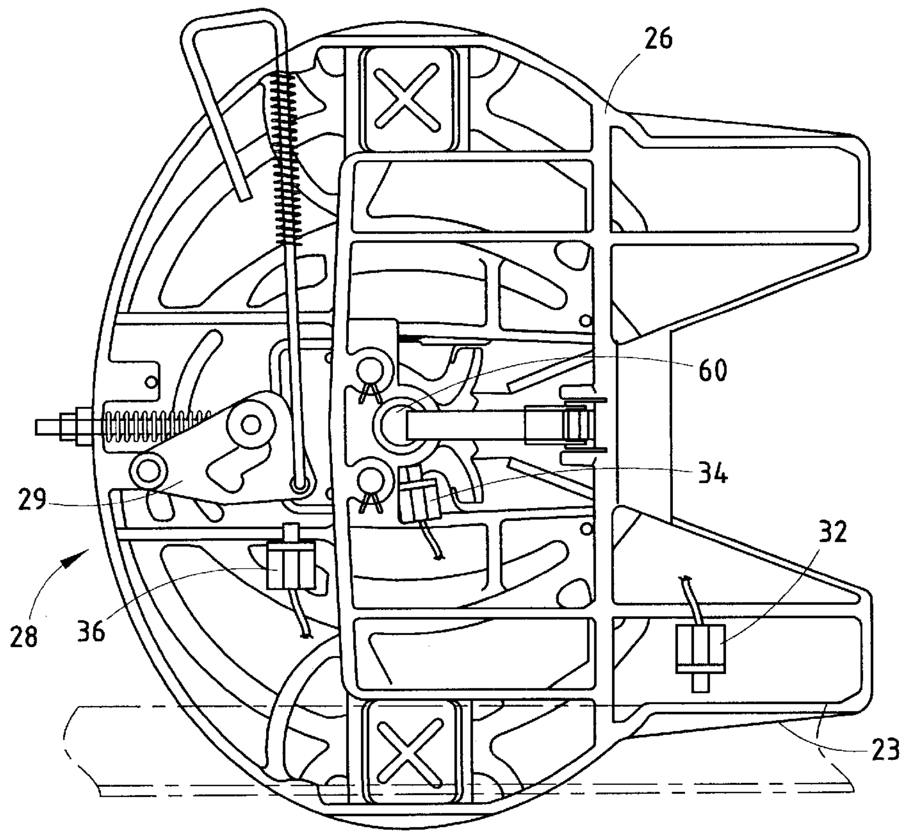
FIG. 1B is a bottom view of the trailer hitch assembly of FIG. 1A.
Figure 1C:
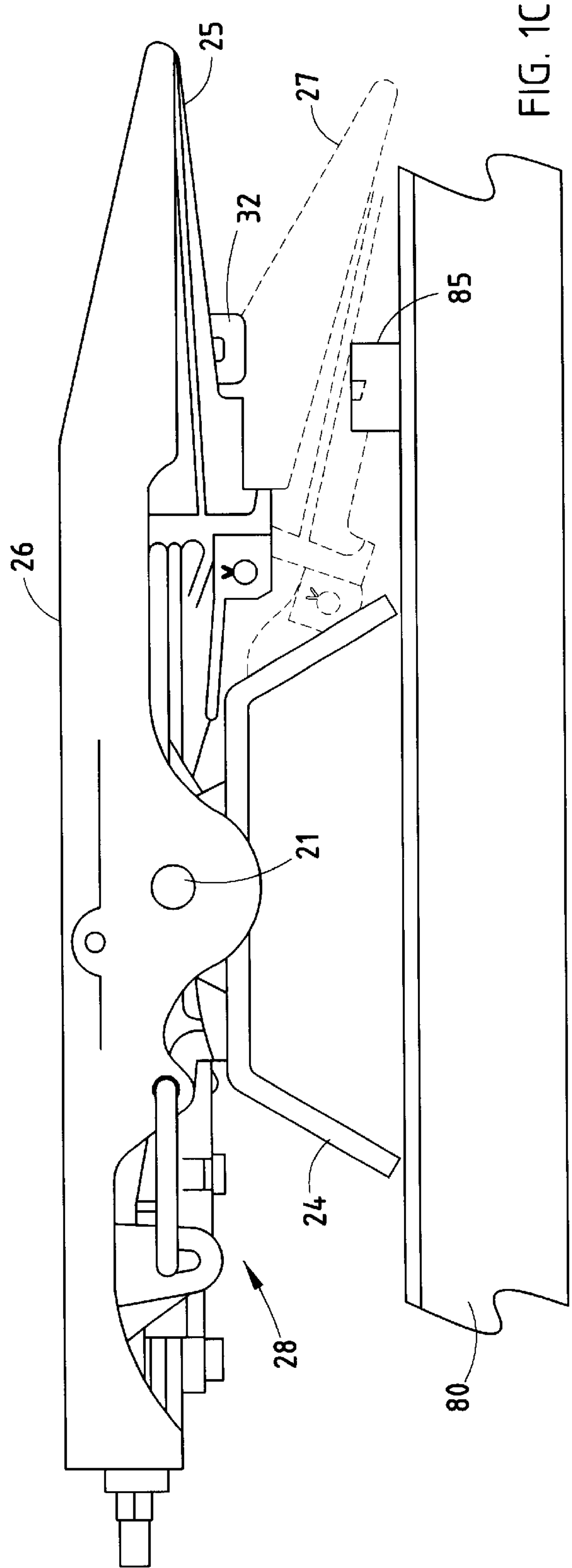
FIG. 1C is a side view of the trailer hitch assembly of FIG. 1A.
Figure 1D:
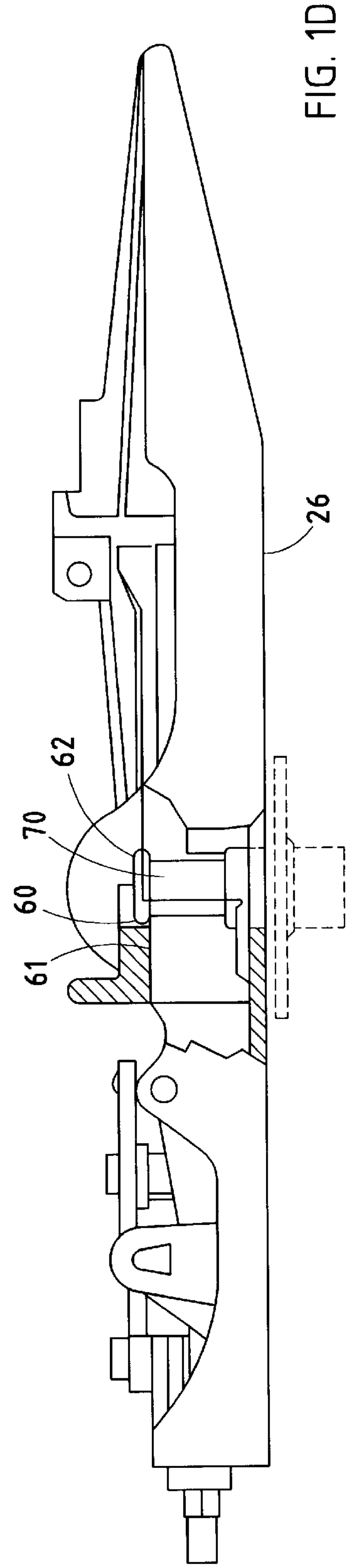
FIG. 1D is a side view and partial cross-section of the trailer hitch assembly shown in FIG. 1B.

FIGS. 1B–1D provide a more detailed view of trailer hitch assembly 20 of FIG. 1A. In a preferred embodiment, tilt sensor 32 is mounted on a flange 23 of hitch plate 26 such that the sensing end faces outward in a direction perpendicular to the pivot pins 21. FIG. 1C shows the hitch plate 26 from the side in combination with base 24 in a coupled horizontal position 25 and in an uncoupled at rest position 27 (dashed lines). By mounting a metal plate 85 on chassis 80 in a position near where the sensing end of tilt sensor 32 is positioned when trailer hitch plate 26 is in the resting position, tilt sensor 32 detects the presence of plate 85 as a basis for determining that the hitch plate is tilted or at a rest position. When tractor 10 is backed under a trailer, contact is made between a tilted hitch plate 26 and a portion of the trailer. This contact causes hitch plate 26 to rotate into a coupled (horizontal) position. When tilt sensor 32 subsequently detects the absence of plate 85, it can be concluded that hitch plate 26 has been moved from its rest position and the trailer is in proximity to the hitch assembly. Alternatively, sensor 32 may be mounted so as to detect metal when hitch plate 26 is in the horizontal coupled position.

FIG. 1B shows kingpin sensor 34 mounted to hitch plate 26 with the sensing end near the throat 60 formed in hitch plate 26, into which a trailer kingpin 70 is positioned and locked. FIG. 1D provides an upside-down side view and partial cross-section illustrating the location of trailer kingpin 70 when properly disposed in throat 60. As constructed, kingpin sensor 34 outputs a detection signal when the metal trailer kingpin's lower flange is disposed in throat 60, below a lock plane 61. That is, kingpin sensor 34 is in a plane below locking mechanism 28 and only detects kingpin 70 when a kingpin rib 62 of kingpin 70 extends below lock plane 61. The location of kingpin sensor 34 prevents it from indicating that kingpin 70 is present when a high coupling occurs, which prevents locking mechanism 28 from securing kingpin 70 (i.e., the trailer) to hitch plate assembly 20. Locking mechanism 28, of hitch plate assembly 20, is biased by a compression spring to automatically lock-in and secure the trailer kingpin 70, as soon as it enters the hitch throat 60. FIG. 1B shows lock sensor 36 mounted to hitch plate 26 such that a sensing end is in a position proximate to a position of that of a metal cam plate 29 (of locking mechanism 28) when in a locked position. In this manner, lock sensor 36 detects the presence of cam plate 29 as a basis for detecting if the locking mechanism is in a locked and secured position. Those of ordinary skill in the art will appreciate that the present invention may be used in connection with any type of a locking mechanism. It should also be noted that the present invention may be applied to trailer hitch assemblies having other constructions and is not limited to particular mounting locations shown for sensors 32, 34 and 36.

Figure 1E:
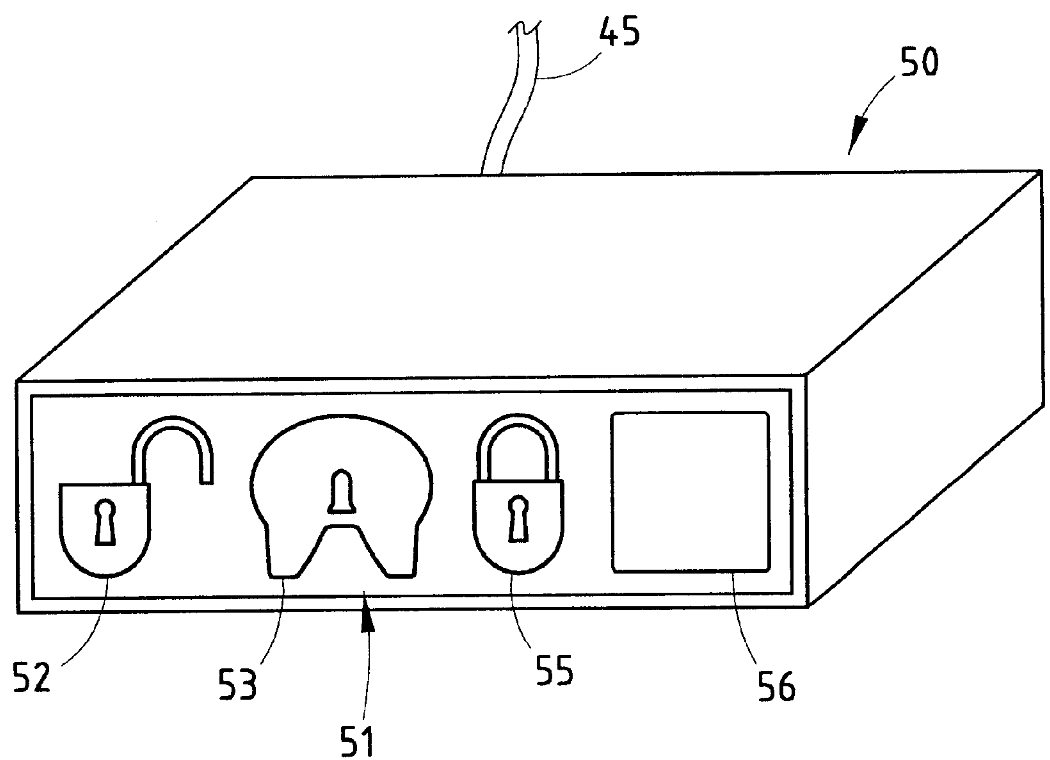
FIG. 1E is an isometric view of an output device for providing coupling status information to a driver of the truck tractor of FIG. 1A.

FIG. 1E illustrates an exemplary output device 50. Multi-conductor cable 45 couples sensors 32, 34 and 36 to output device 50. The internal components (i.e., the control circuitry) of output device 50 are further shown in FIG. 1F. Output device 50 includes a display panel 51 for providing coupling status information to a driver of tractor 10. In a preferred embodiment, display panel 51 includes an 'unlocked' icon 52, a 'locked' icon 55, a 'fifth wheel' icon 53 and a seven segment display 56. In that embodiment, display 56 provides an error code indicating possible sources of a coupling malfunction.

Preferably, a red light emitting diode (LED) is provided behind 'unlocked' icon 52 (i.e., a red unlock indicator). Also, a yellow, a red and a green LED are provided behind 'fifth wheel' icon 53 (i.e., a yellow, red and green fifth wheel indicator) and a green LED is provided behind 'lock' icon 55 (i.e., a green lock indicator). One of ordinary skill in the art will appreciate that the individual LEDs could be replaced with an LED array capable of providing multiple colors. While output device 50, as shown, only includes visual indicators, one of skill in the art will readily appreciate that an audio output can be provided. For example, by adding a speaker and appropriate voice processing circuitry, output device 50 can provide voice output to instruct a driver as to possible causes of a coupling malfunction. Additionally, a warning buzzer may be activated in addition to, or as an alternative to, providing an unlocked icon 52.

Figure 1F:
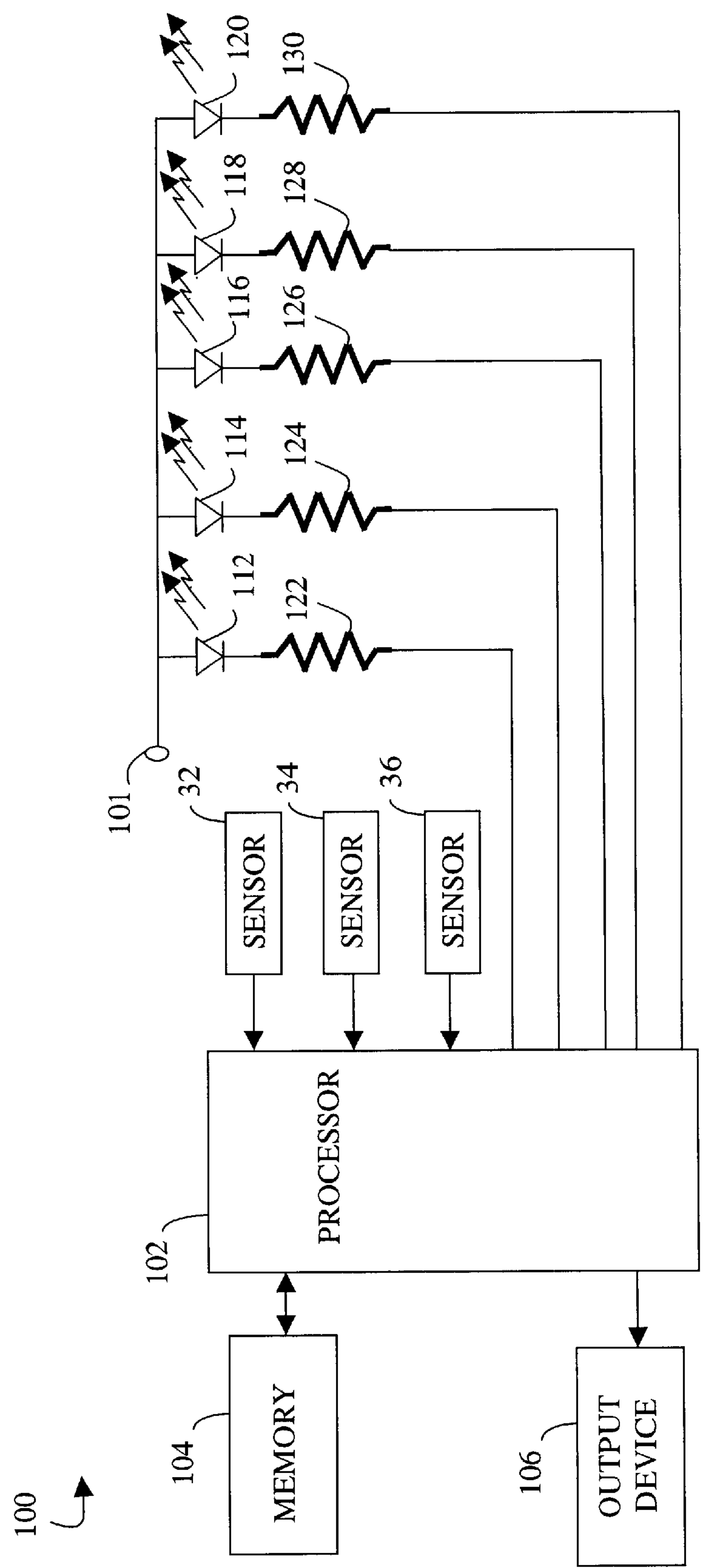
FIG. 1F is a block diagram of an electronic system for monitoring the trailer hitch assembly of FIG. 1A, according to an embodiment of the present invention.

FIG. 1F depicts a block diagram of an electronic system 100, according to an embodiment of the present invention. Electronic system 100 includes a processor 102 that receives input from sensors 32, 34 and 36. Processor 102 is also coupled to a memory 104 and an output device 106. In a preferred embodiment, processor 102 is a PIC16C62, manufactured by Microchip Technology Inc. of Chandler, Ariz. A plurality of outputs of processor 102 are coupled through current limiting resistors 122, 124, 126, 128 and 130 to LED's 112, 114, 116, 118 and 120, respectively. Processor 102 runs a routine that, depending upon the input from sensors 32, 34 and 36, may cause an error code to appear on output device 106 and may cause different ones or combinations of LEDs 112–120 to be illuminated.

Memory 104 includes an application specific amount of electrically erasable programmable read-only memory (EEPROM) that enables processor 102 to store a history of changes in position of a trailer and a locking mechanism, as respectively sensed by a trailer sensor and a lock sensor. For example, sequences of changes in sensor status may be stored in first-in, first-out (FIFO) manner. Such information is useful for determining whether an accidental uncoupling occurred due to an unexpected mechanical error or if the driver had neglected to pay attention to prior error codes. This information may also be useful when training truck drivers on proper coupling. In a preferred embodiment, memory 104 is a 24C08, manufactured by Microchip Technology Inc., and may be remotely coupled to processor 102 such that the sensor data stored within it can be readily retrieved by coupling it to an external computer system. Depending upon the application, tilt sensor 32 may not be implemented. In a preferred embodiment, output device 106 is a seven segment display. In normal operation, a positive voltage is applied at terminal 101 that enables LEDs 112–120 to emit light, as dictated by processor 102.

FIGS. 2A–2G are a flow chart of a routine 200, that runs on processor 102, that determines whether the trailer hitch assembly is properly coupled to the trailer. This is accomplished, in part, by taking into account the sequence in which a kingpin sensor and a lock sensor sense the respective positions of a trailer kingpin and a locking mechanism, as well as, a time period elapsing between the sensing of such positions. Table 1, provided below, lists error codes and troubleshooting information that corresponds to routine 200, of FIGS. 2A–2G. Routine 200 is initiated when the vehicle is started (step 202). Because the control circuit 100 printed circuit board (PCB) receives power from the vehicle ignition, when the vehicle is not running, power is not supplied to the PCB. Thus, so long as the vehicle is running, power is applied to the PCB (step 210). Next, in step 212, the "attempt" variable, which tracks the number of times a coupling has been attempted without success, is set equal to zero. From step 212, control transfers to step 214 where a first timer ('timer') is set equal to zero and the "attempt" variable is incremented, by one. Then, control transfers to step 216 where the first timer is started.

TABLE 1

| ERROR CODE | SENSOR STATUS KP | LOCK | DESCRIPTION | DRIVER INSTRUCTIONS | TECHNICIAN INSTRUCTION/POSSIBLE CAUSES |
|---|---|---|---|---|---|
| 0 | — | — | After ready condition First attempt Any fault | Re-couple following procedure | None |
| 1 | No | Closed | After Start-up | Perform Visual Inspection No Kingpin Re-couple following procedure | Damaged or misadjusted KP sensor Locks closed or Damaged or misadjusted lock sensor |
| 2 | Yes | Open | After Start-up | Perform Visual Inspection Lock Open Re-couple following procedure | Lock not closed Damaged or misadjusted lock sensor Damaged or misadjusted KP sensor Debris in FW throat |
| 3 | | | Not Used | | None |
| 4 | | | Not Used | | None |
| 5 | No | Closed | Second attempt Lock closed prior to kingpin | Perform visual inspection High couple Re-couple following procedure | Damaged or misadjusted KP sensor Attempted high couple and locks skidded closed |
| 6 | No | Open | Second attempt Kingpin disappeared before lock closed | Perform visual inspection Kingpin bounced out Re-couple following procedure | Kingpin bounced out Binding in Fifth wheel |
| 7 | Yes | Open | Too long of a delay between kingpin and lock closing | Perform visual inspection Slow locking Re-couple following procedure | Binding in fifth wheel Damaged or misadjusted lock sensor |
| 8 | No | Closed | Was coupled Lost kingpin Lock still closed | Perform visual inspection Lost Kingpin Re-couple following procedure | Damaged or misadjusted kingpin sensor |
| 9 | Yes | Open | Was coupled Lock Opened Kingpin still present | Perform visual inspection Lock open Re-couple following procedure | Part of normal uncoupling procedure Damaged or misadjusted lock sensor |

Next, in step 218, processor 102 determines if there is no kingpin present and the lock is open. Processor 102 reads the signals supplied by kingpin sensor 34 and lock sensor 36 in making this determination. If the kingpin sensor indicates the kingpin is not present and the lock sensor indicates the lock is open, control transfers to step 220. Otherwise, control transfers to step 248 (see FIG. 2C). In step 220, processor 102, running routine 200, again determines if there is no kingpin present and the lock is open. If the kingpin sensor indicates the kingpin is not present and the lock sensor indicates the lock is open, control transfers to step 224. Otherwise, control transfers to step 232 (see FIG. 2B).

In step 224, processor 102 determines if the first timer is greater than 1024 seconds. If not, control transfers to step 226 where processor 102 activates (if it is not already active) the yellow fifth wheel indicator. The yellow indicator advises the driver that the hitch is ready for coupling. If the first timer is greater than 1024 seconds, control transfers to step 228 where processor 102 deactivates the yellow fifth wheel indicator. This timing sequence insures that the yellow indicator is not illuminated for any extended period, such as when the driver is driving any appreciable distance without a trailer. From steps 226 and 228, control returns to step 220. Thus, as long as the kingpin is not present and the lock is open, control continuously loops from step 220 to step 224 to step 226 (or step 228) and back to step 220, when the vehicle is running. When this condition is no longer true, control transfers from step 220 to step 232.

Figure 2A:
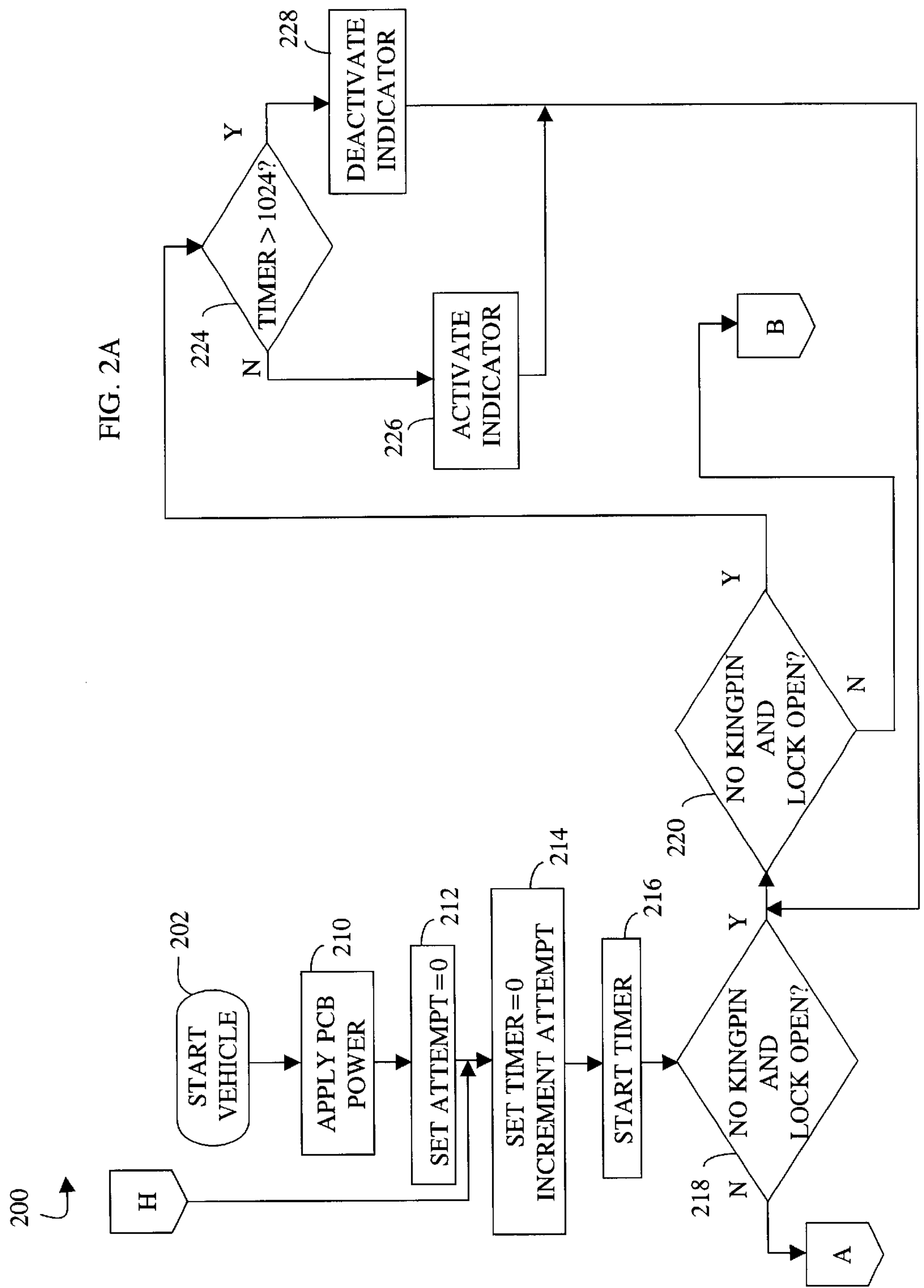
FIGS. 2A–2G are a flow diagram of a routine for determining and displaying coupling status information to a driver of the truck tractor of FIG. 1A, according to an embodiment of the present invention.

In step 232 (FIG. 2B), processor 102 determines if the kingpin is present and the lock is open. If so, control transfers from step 232 to step 234. Otherwise, control transfers to step 316 (FIG. 2G). In step 234, the first timer is set to zero. Next, in step 236, processor 102 starts the first timer. Then, in step 238, processor 102 determines if the kingpin is still present and the lock is open. If so, control transfers from step 238 to step 242. Otherwise, control transfers from step 238 to step 246. In step 242, processor 102 activates (if not already active) the yellow fifth wheel indicator. Next, in step 244, processor 102 determines whether the first timer is greater than one second. If so, control transfers to step 280 (FIG. 2E). Otherwise, control returns to step 238.

In step 246, processor 102 determines if the kingpin is present and the lock is closed. If so, control transfers to step 260 (FIG. 2D). Otherwise, control transfers from step 246 to step 284 (FIG. 2E) for error processing. In step 280 (FIG. 2E), processor 102 provides an appropriate error code (i.e., '7') and activates the red fifth wheel indicator and the red unlock indicator. An error code of '7' indicates that too long of a time period elapsed between the kingpin being present and the lock closing (i.e., more than one second). Next, in step 282, processor 102 determines if the kingpin is no longer present and the lock is open. So long as the condition is not true, control loops through step 282 and step 280. When the condition is true, control transfers from step 282 to step 214.

In step 284 (FIG. 2E), processor 102 determines if the "attempt" variable is equal to one. That is, whether more than one unsuccessful attempt has been made to couple the tractor to the trailer. If the "attempt" variable is equal to one, control transfers from step 284 to step 290. Otherwise, control transfers from step 284 to step 286. In step 286, processor 102 provides an appropriate error code (i.e., '6') and activates the red unlock indicator and the red fifth wheel indicator. An error code of '6' indicates that on a second attempt the kingpin did not appear before the lock closed. Next, in step 288, processor 102 determines if there is a no kingpin present and the lock is open. If so, control transfers to step 214 (FIG. 2A). Otherwise, returns to step 286.

In step 290, processor 102 provides an appropriate error code (i.e., '0') and activates the red unlock indicator and may activate the red fifth wheel indicator. An error code of '0' may indicate any error that occurred during a first coupling attempt. At that point, control transfers to step 292 where processor 102 determines if there is no kingpin present and the lock is open. If so, control transfers to step 214. Otherwise, control returns to step 290.

Figure 2B:
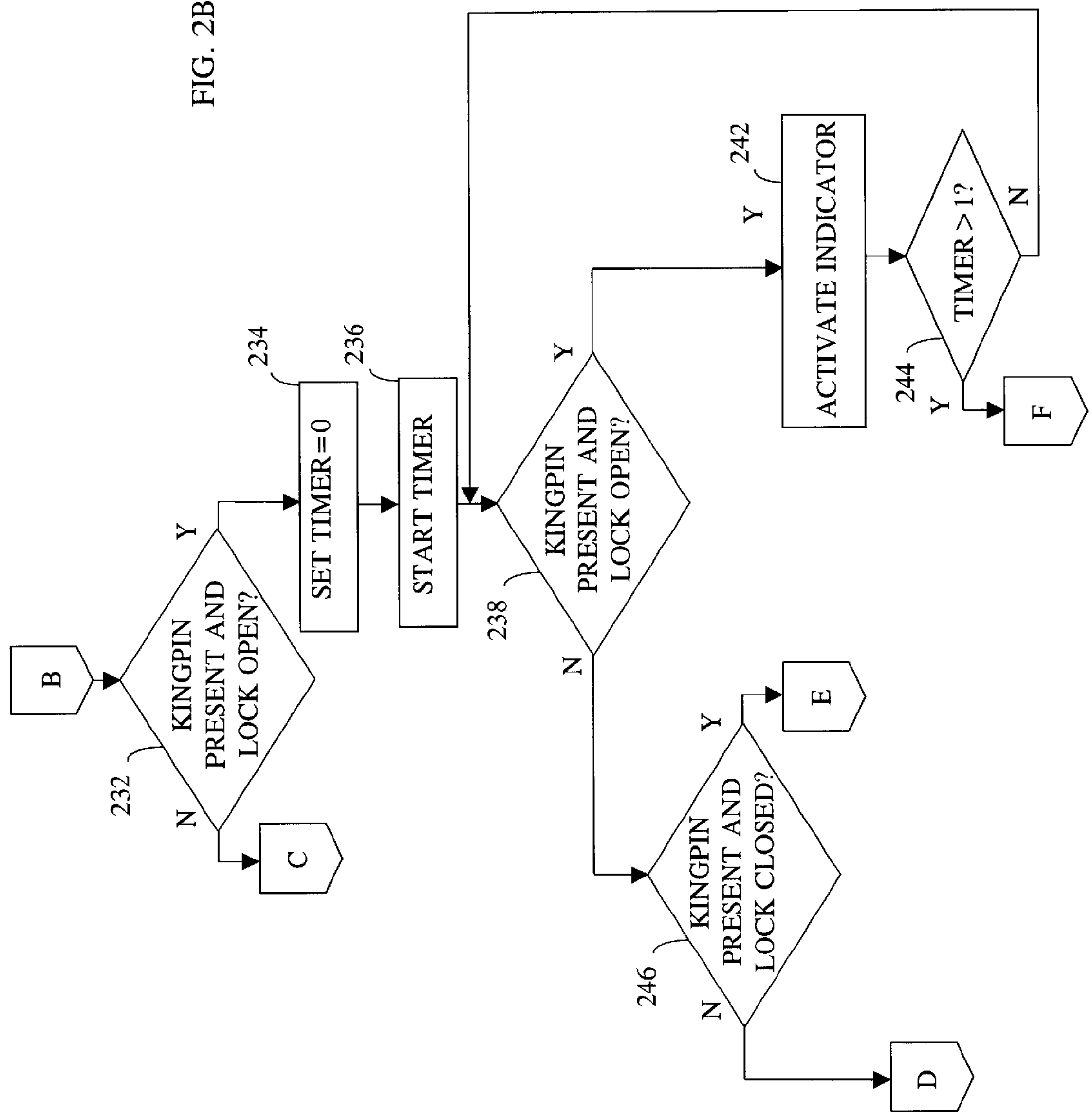
Figure 2C:
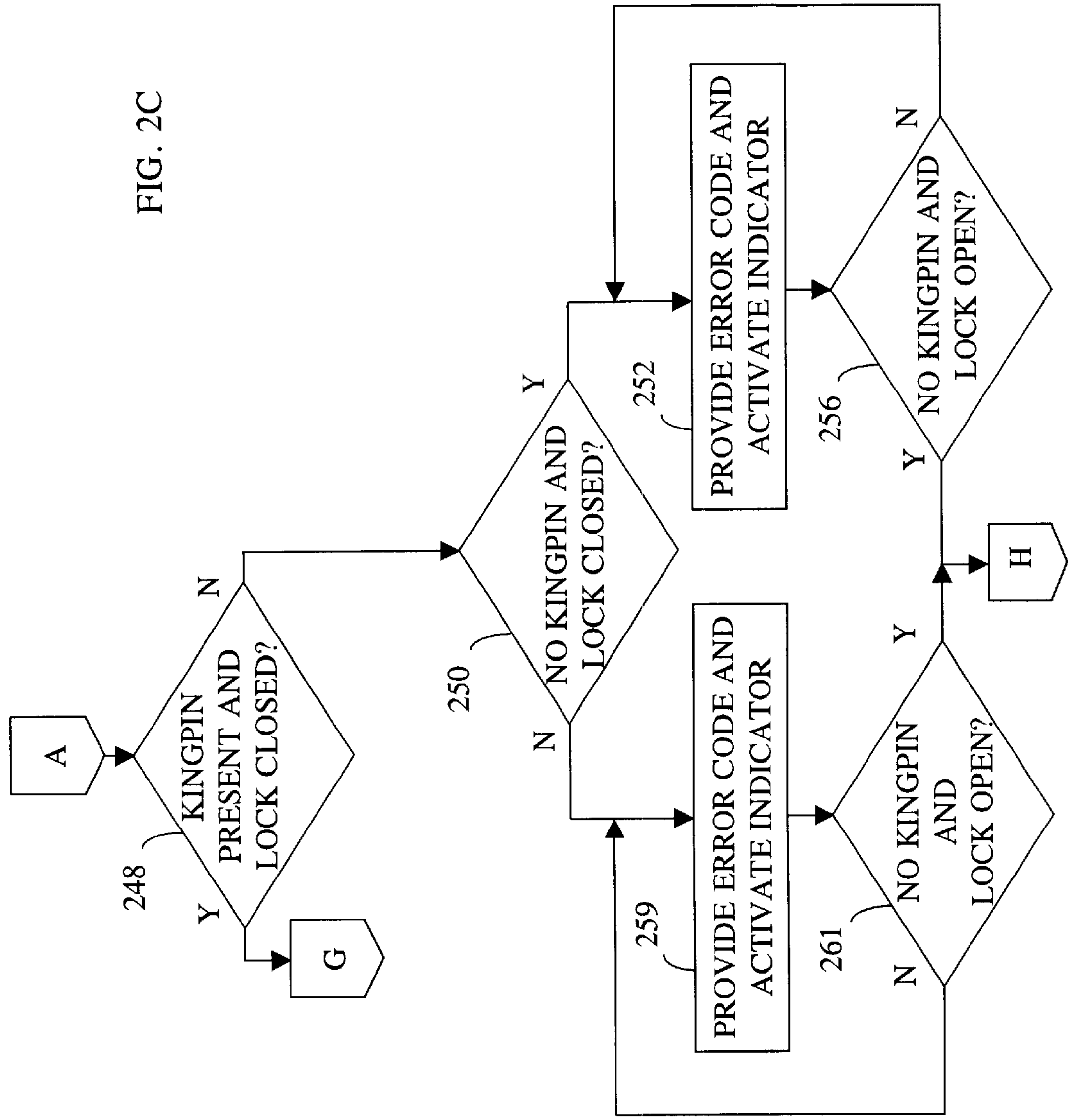
Figure 2D:
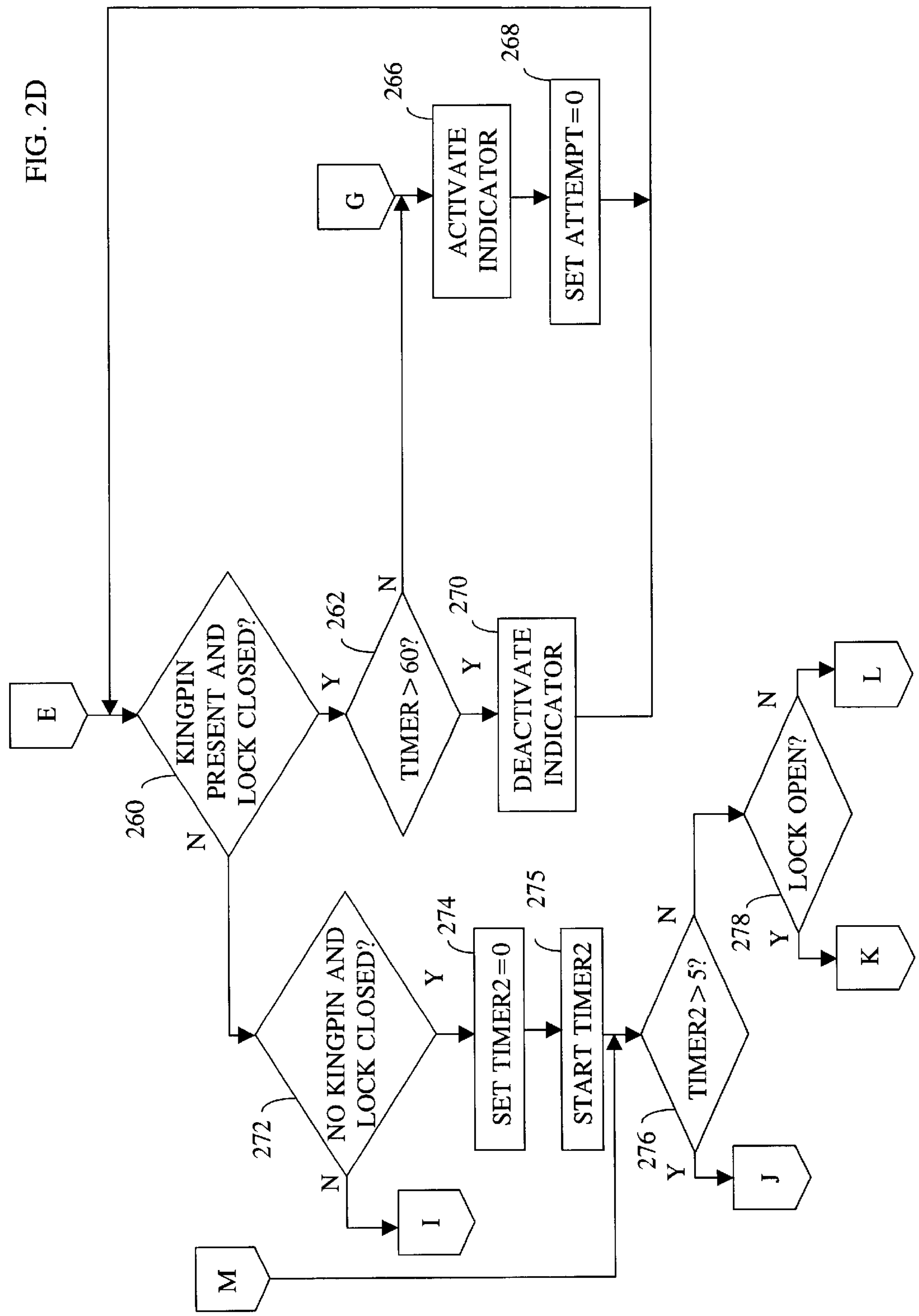
Figure 2E:
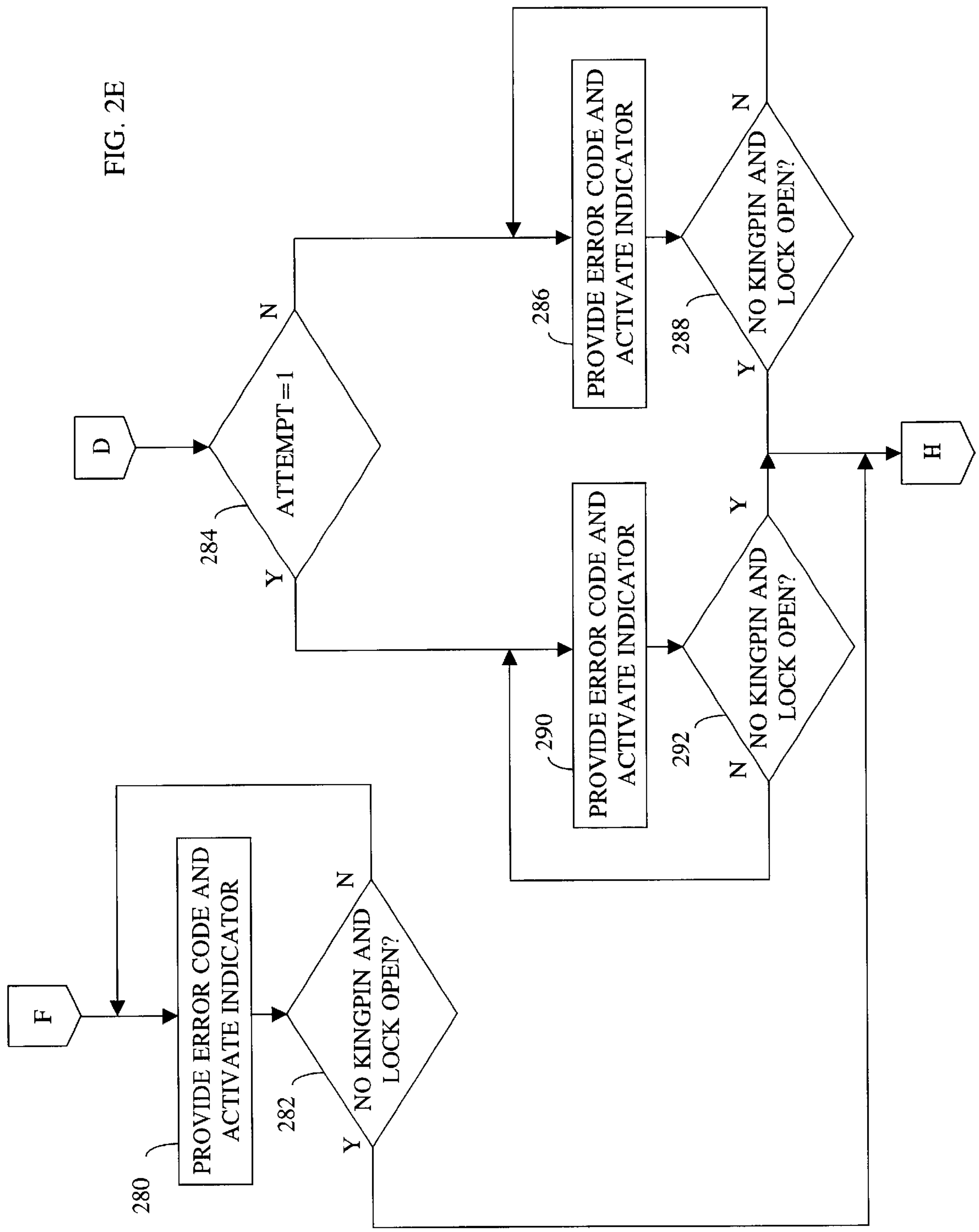

Step 260 (FIG. 2D), is executed following a determination that the kingpin is present and the lock is closed (step 246 in FIG. 2B). In step 260, processor 102, executing routine 200, determines if the kingpin is still present and the lock is still closed. If so, control transfers to step 262 where processor 102 determines if the first timer is greater than sixty seconds. If the first timer is not greater than sixty seconds, control transfers to step 266 where processor 102 activates (if it is not already active) the green fifth wheel indicator and the green lock indicator to indicate that proper coupling has been accomplished. Next, in step 268, the "attempt" variable is set to zero and the process loops through steps 260–268 until the timer exceeds sixty seconds or the kingpin or lock status changes. If the first timer exceeds sixty seconds, in step 262, control transfers to step 270 where processor 102 deactivates the green fifth wheel indicator and the green lock indicator. At that point, control transfers to step 260. If either the kingpin is not present or the lock is not closed in step 260, control transfers to step 272. Otherwise, the process continuously loops through steps 260, 262 and 270.

Figure 2F:
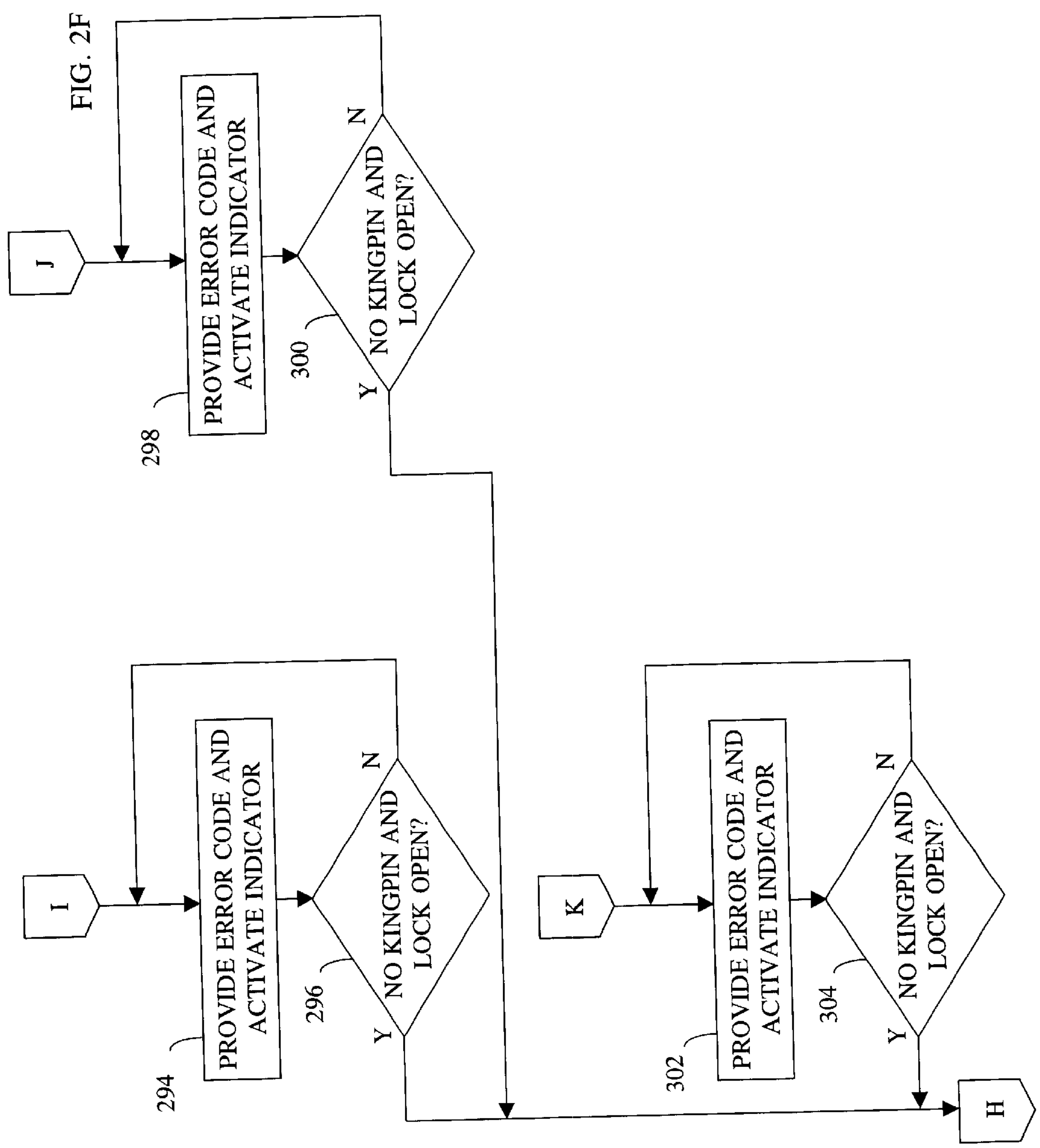
Figure 2G:
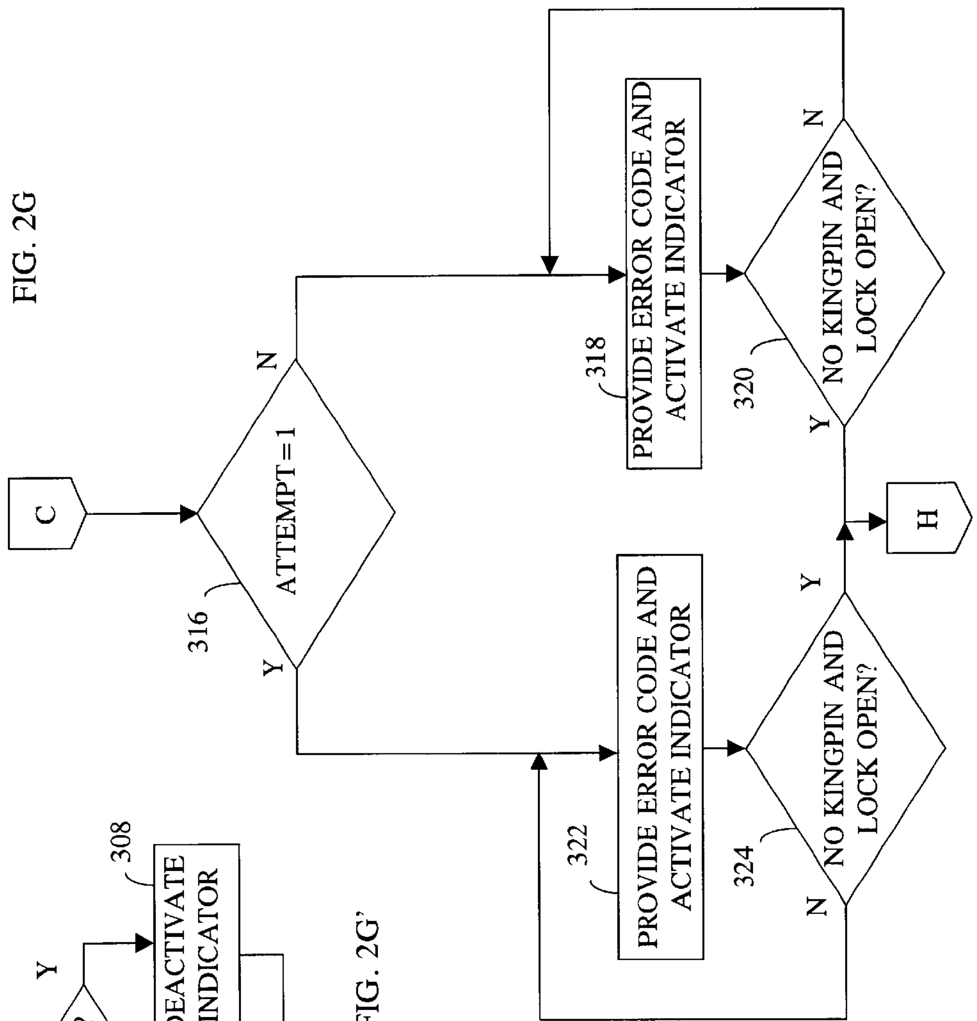
Figure 2G:
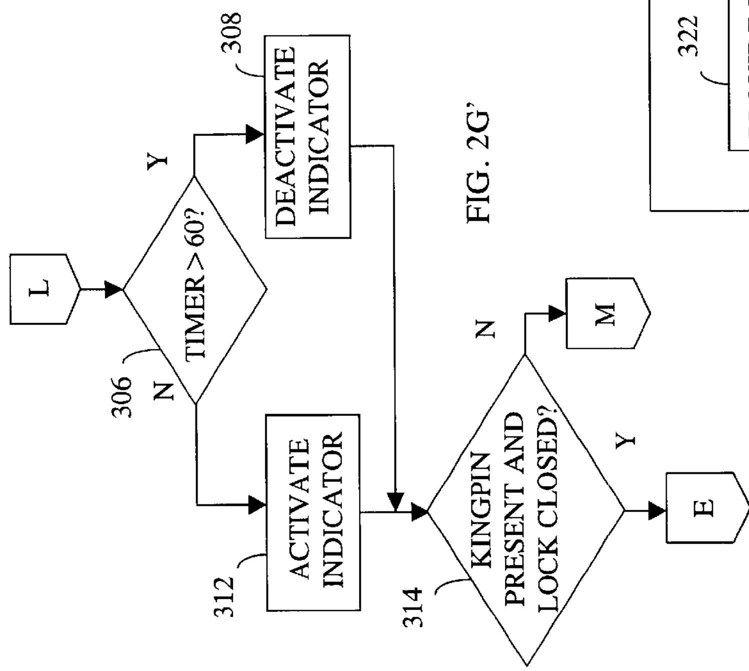

In step 272, processor 102 determines if there is no kingpin present and the lock is closed. If so, control transfers from step 272 to step 274. Otherwise, control transfers from step 272 to step 294 (FIG. 2F). In step 294 (FIG. 2F), processor 102 provides an appropriate error code (i.e., '9') and activates the red unlock indicator and the red fifth wheel indicator. An error code of '9' indicates that kingpin is present, but the lock is open. This would suggest either that the driver is intentionally uncoupling or that the locking mechanism failed. At that point, control transfers to step 296 where processor 102 determines if there is no kingpin present and the lock is open. If so, control transfers to step 214. Otherwise, control returns to step 294.

In step 274 (FIG. 2D), a second timer is initialized to zero. Next, control transfers to step 275 where processor 102 starts the second timer. Then, in step 276, processor 102 determines if the second timer is greater than five seconds. If so, control transfers from step 276 to step 298 (FIG. 2F) to indicate that an uncoupling may have occurred. Otherwise, control transfers from step 276 to step 278 in which processor 102 determines if the lock is open. If so, processor 102 determines that either the locking mechanism failed or the driver is intentionally uncoupling the trailer, and thus control transfers to step 302 (FIG. 2F). Otherwise, processor 102 determines that the kingpin sensor only momentarily stopped sensing the kingpin, as may be the case when driving over a bump in the road, etc., and thus control transfers from step 278 to step 306 (FIG. 2G).

In step 298 (FIG. 2F), processor 102 provides an appropriate error code (i.e., '8') and activates the red fifth wheel indicator. An error code of '8' indicates that the lock is closed, but the kingpin is not present. At that point, control transfers to step 300 where processor 102 determines if there is no kingpin present and the lock is open. If so, control transfers to step 214. Otherwise, control returns to step 298.

In step 302 (FIG. 2F), processor 102 provides an appropriate error code (i.e., '9') and activates the red unlock indicator and the red fifth wheel indicator. An error code of '9' indicates the lock is open. At that point, control transfers to step 304 where processor 102 determines if there is no kingpin present and the lock is open. If so, control transfers to step 214. Otherwise, control returns to step 302.

In step 306 (FIG. 2G), processor 102 determines if the first timer has exceeded sixty seconds. If not, control transfers from step 306 to step 312 where processor 102 activates (if they are not already active) the green fifth wheel indicator and the green lock indicator. If the first timer has exceeded sixty seconds, control transfers to step 308 where processor 102 deactivates the green fifth wheel indicator and the green lock indicator. From steps 312 and 308, control transfers to step 314 where processor 102 determines if the kingpin is present and the lock is closed. If so, control transfers to step 260 (FIG. 2D). Otherwise, control transfers to step 276.

Referring back to FIG. 2C, in step 248, processor 102 determines if the kingpin is present and the lock is closed. This step follows upon the determination that the kingpin is present and/or the lock is closed following vehicle start-up in step 218 (FIG. 2A). If the kingpin is present and the lock is closed, processor 102 determines that the truck was started with the trailer already properly coupled and control transfers from step 248 to step 266 to indicate proper coupling. Otherwise, control transfers from step 248 to step 250 in which processor 102 determines if there is no kingpin present and the lock is closed. If so, control passes to step 252. Otherwise, processor 102 determines that the lock release may have been pulled while the truck was stopped, and control passes to step 259. In step 259, processor 102 provides an appropriate error code (i.e., '2') and activates the red unlock indicator and the red fifth wheel indicator. An error code of '2' indicates that while the kingpin is present the lock is open. Next, in step 261, processor 102 determines if there is a no kingpin present and the lock is open. If so, control transfers to step 214. Otherwise, control transfers returns to step 259.

In step 252, processor 102 provides an appropriate error code (i.e., '1') and activates the red fifth wheel indicator. An error code of '1' indicates that the kingpin is not present even though the lock is closed. At that point, control transfers to step 256 where processor 102 determines if there is no kingpin present and the lock is open. If so, control transfers to step 214. Otherwise, control returns to step 252.

In step 316 (FIG. 2G), processor 102 determines if the "attempt" variable is equal to one. That is, whether more than one unsuccessful attempt has been made to couple the tractor to the trailer. If the "attempt" variable is equal to one, control transfers from step 316 to step 322. Otherwise, control transfers from step 316 to step 318. In step 318, processor 102 provides an appropriate error code (i.e., '5') and activates the red fifth wheel indicator. An error code of '5' indicates that on a second attempt the lock closed prior to the kingpin being present. Next, in step 320, processor 102 determines if there is a no kingpin present and the lock is open. If so, control transfers to step 214. Otherwise, control returns to step 318.

In step 322, processor 102 provides an appropriate error code (i.e., '0') and activates the red fifth wheel indicator and may activate the red unlock indicator. An error code of '0' may indicate any error that occurred during a first coupling attempt. At that point, control transfers to step 324 where processor 102 determines if there is no kingpin present and the lock is open. If so, control transfers to step 214. Otherwise, control transfers from step 324 to step 322.

Thus, routine 200 as described above, takes into account the sequence in which a kingpin sensor and a lock sensor sense the respective positions of a trailer kingpin and a locking mechanism, as well as, a time period elapsing between the sensing of such positions.

Figure 3A:
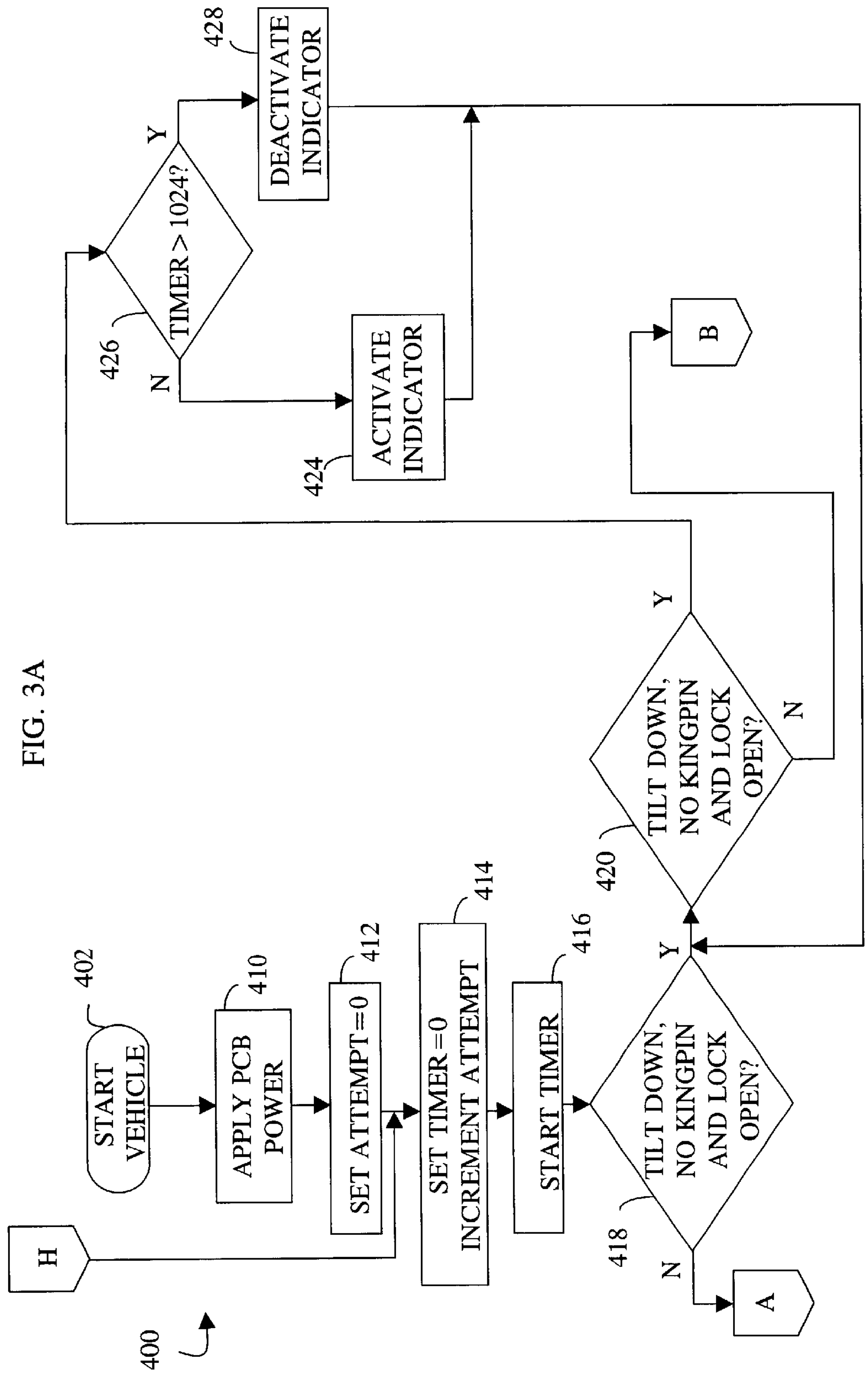
FIGS. 3A–3J are another flow diagram of a routine for determining and displaying coupling status information to a driver of the truck tractor of FIG. 1A, according to another embodiment of the present invention.
Figure 3B:
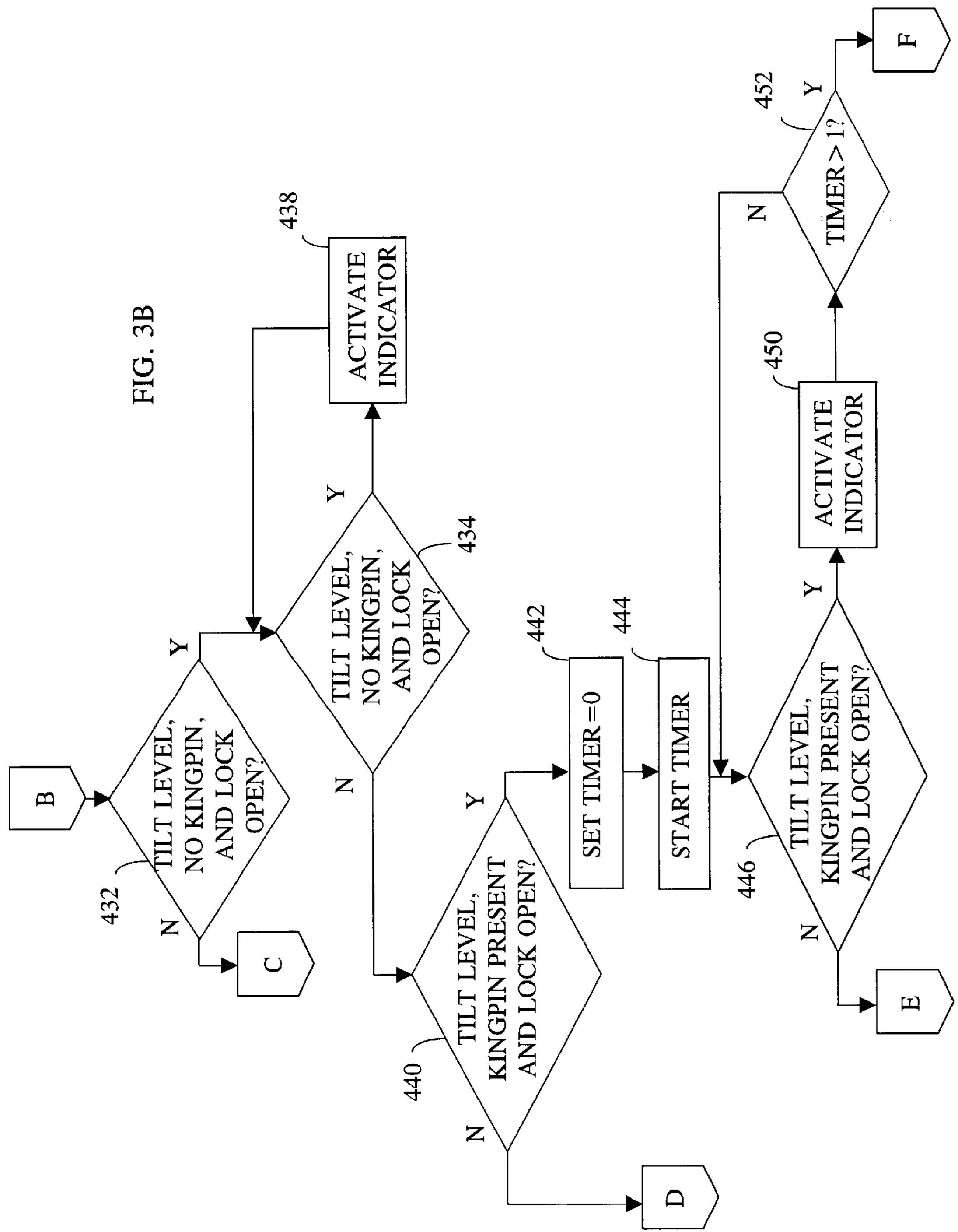
Figure 3C:
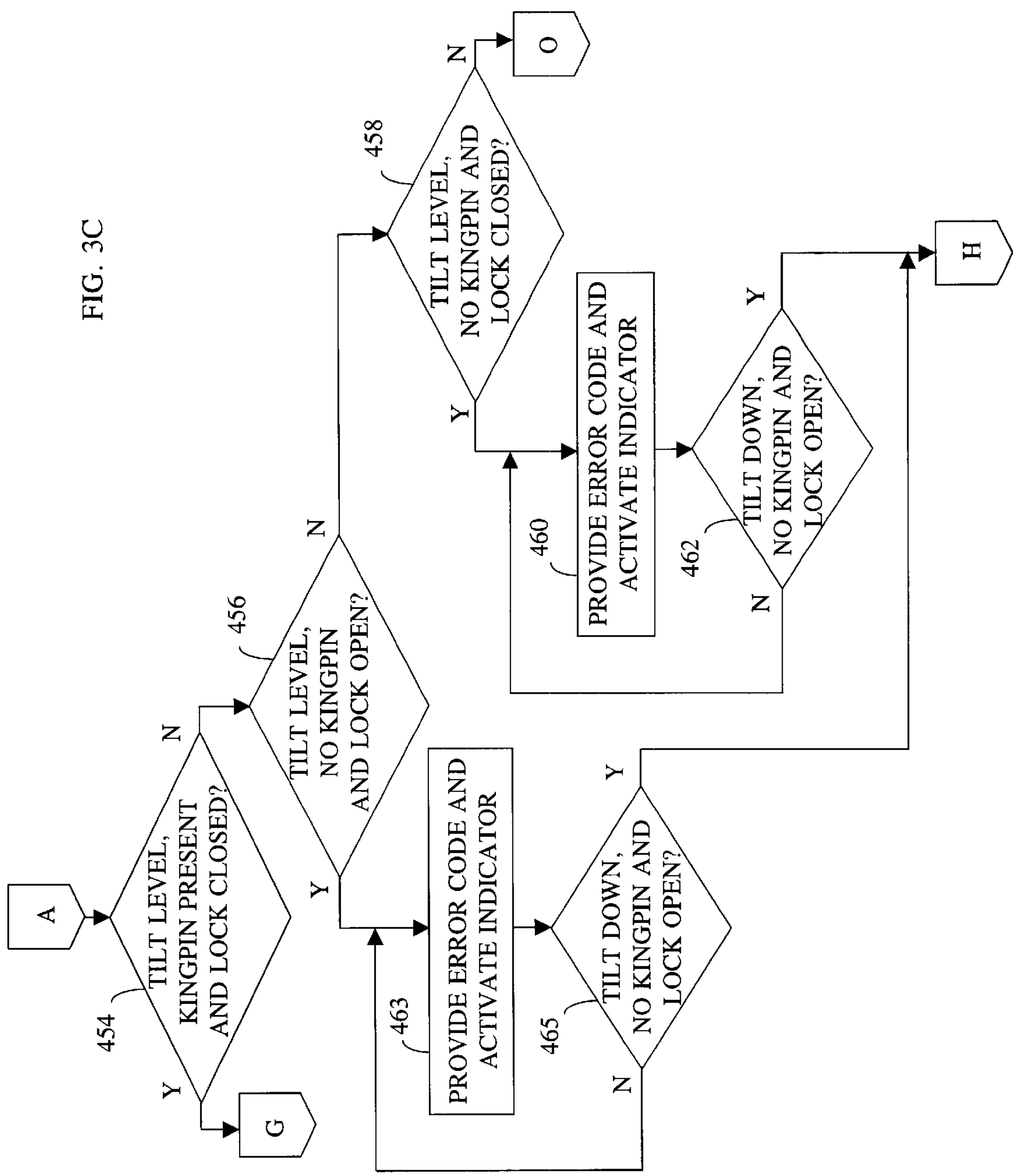

FIGS. 3A–3J are a flow chart of a routine 400, that runs on processor 102, for determining a potential cause of improper coupling by taking in account the sequence in which a tilt sensor, a kingpin sensor and a lock sensor sense the respective positions of the trailer hitch plate, the trailer kingpin and the locking mechanism. In a preferred embodiment, processor 102 determines which routine 200 or 400 to execute by determining whether a routine selecting jumper (not shown) is present on the control circuit PCB. In addition, the time period elapsing between the sensing of the kingpin and the closing of the locking mechanism is tracked. Table 2, provided below, lists error code and troubleshooting information that corresponds to routine 400 of FIGS. 3A–3J. Like routine 200, routine 400 runs on processor 102, as long as the vehicle is running. A primary difference between routines 400 and 200 is the consideration of sensor data provided by tilt sensor 32. When the vehicle is not running, power is removed from the control circuit PCB.

number of coupling attempts that have occurred, such that an appropriate error code can be displayed to a driver. Next, in step 414, processor 102 initializes a first timer to zero and increments, by one, the "attempt" variable. Then, processor 102 starts the first timer in step 416. Next, in step 418, processor 102 determines if the tilt is down, there is no kingpin present and the lock is open. As above, processor 102 determines these conditions by reading the outputs provided by sensors 32, 34 and 36. If the condition is true, control transfers from step 418 to step 420. Otherwise, control transfers from step 418 to step 454 (FIG. 3C).

In step 420, processor 102 determines if the tilt is down, there is no kingpin present and the lock is open. If so, control transfers from step 420 to step 426. In step 426, processor 102 determines if the first timer is greater than 1024 seconds. If not, in step 424, processor 102 activates (if not already active) the yellow fifth wheel indicator. The yellow indicator advises the driver that the hitch is ready for coupling. Otherwise, control transfers to step 428 where processor 102 deactivates the yellow fifth wheel indicator. This timing sequence insures that the yellow indicator is not illuminated for any extended period, such as when the driver is driving any appreciable distance without a trailer. From steps 424 and 428, control transfers to step 420. While the tilt is down, there is no kingpin present and the lock is open, the loop from step 420 to step 426 to either step 424 or step 428 and back to step 420 continues, while the vehicle is running.

TABLE 2

| | SENSOR STATUS | | | | | |
|---|---|---|---|---|---|---|
| ERROR CODE | TILT | KING-PIN | LOCK | DESCRIPTION | DRIVER INSTRUCTIONS | TECH INSTRUCTIONS/POSSIBLE CAUSES |
| 0 | — | — | — | After Ready Condition<br>First attempt<br>Any Fault | Re-couple following procedure | None |
| 1 | Level | No | Open | After Start-up | Perform visual inspection<br>Top plate not oriented properly | Damaged or loose tilt sensor<br>Top plate won't tilt down |
| | Down | Yes | Closed | | Re-couple following procedure | Fifth wheel coupled and tilted |
| 2 | Level | No | Closed | After Start-up | Perform visual inspection<br>Improper kingpin status | Damaged or loose Kingpin sensor<br>High couple |
| | Down | Yes | Open | | Re-couple following procedure | Debris in the throat of the fifth wheel |
| 3 | Level | Yes | Open | After start-up | Perform visual inspection<br>Improper lock status | Damaged or loose lock sensor<br>Binding in the fifth wheel |
| | Down | No | Closed | | Re-couple following procedure | Lock closed or high couple |
| 4 | Down | No | Closed | Second attempt<br>Lock closed prior to | Perform visual inspection<br>High couple | Damaged or loose KINGPIN sensor<br>Attempted high coupled and locks skidded closed |
| | Level | No | Closed | kingpin | Re-couple following procedure | |
| 5 | Down | Yes | Open | Second attempt<br>Kingpin appeared before<br>tile | Perform visual inspection<br>Top plate did not tilt<br>Re-couple following procedure | Damaged or loose tilt or kingpin sensor<br>Fifth wheel coupled while tilted |
| 6 | Down | Yes | Open | Second attempt<br>Top plate tilted down | Perform visual inspection<br>Top plate tilted down | Damaged or loose tilt sensor<br>Top plate titled down during couple |
| | Down | Yes | Closed | | Re-couple following procedure | |
| 7 | Level | No | Open | Second attempt or after<br>successful couple | Perform visual inspection<br>Kingpin lost | Damaged or loose Kingpin sensor<br>Kingpin bounced for more than 5 seconds |
| | Level | No | Closed | Kingpin lost | Re-couple following procedure | Kingpin bounced out during couple |
| 8 | Level | Yes | Open | Any attempt<br>Lock did not close within<br>1 second after Kingpin<br>appeared | Perform visual inspection<br>Lock did not close fast enough<br>Re-couple following procedure | Damaged or loose lock sensor<br>Binding in the fifth wheel lock<br>Debris on or around the kingpin |
| 9 | Level | Yes | Open | Lock opened after<br>successful couple<br>Part of normal uncoupling<br>procedure | Perform visual inspection<br>Lock open<br>Re-couple following procedure | Part of normal uncoupling procedure<br>Damaged or loose sensor |

In step 410, when power is applied to the PCB, a boot-up routine is ran by processor 102. At that point, routine 400 is executed and control transfers to step 412 where processor 102, running routine 400, initializes an "attempt" variable to zero. As above, the "attempt" variable is used to track the When the condition of the sensors changes such that this condition is no longer satisfied, control transfers from step 420 to step 432 (FIG. B).

Figure 3D:
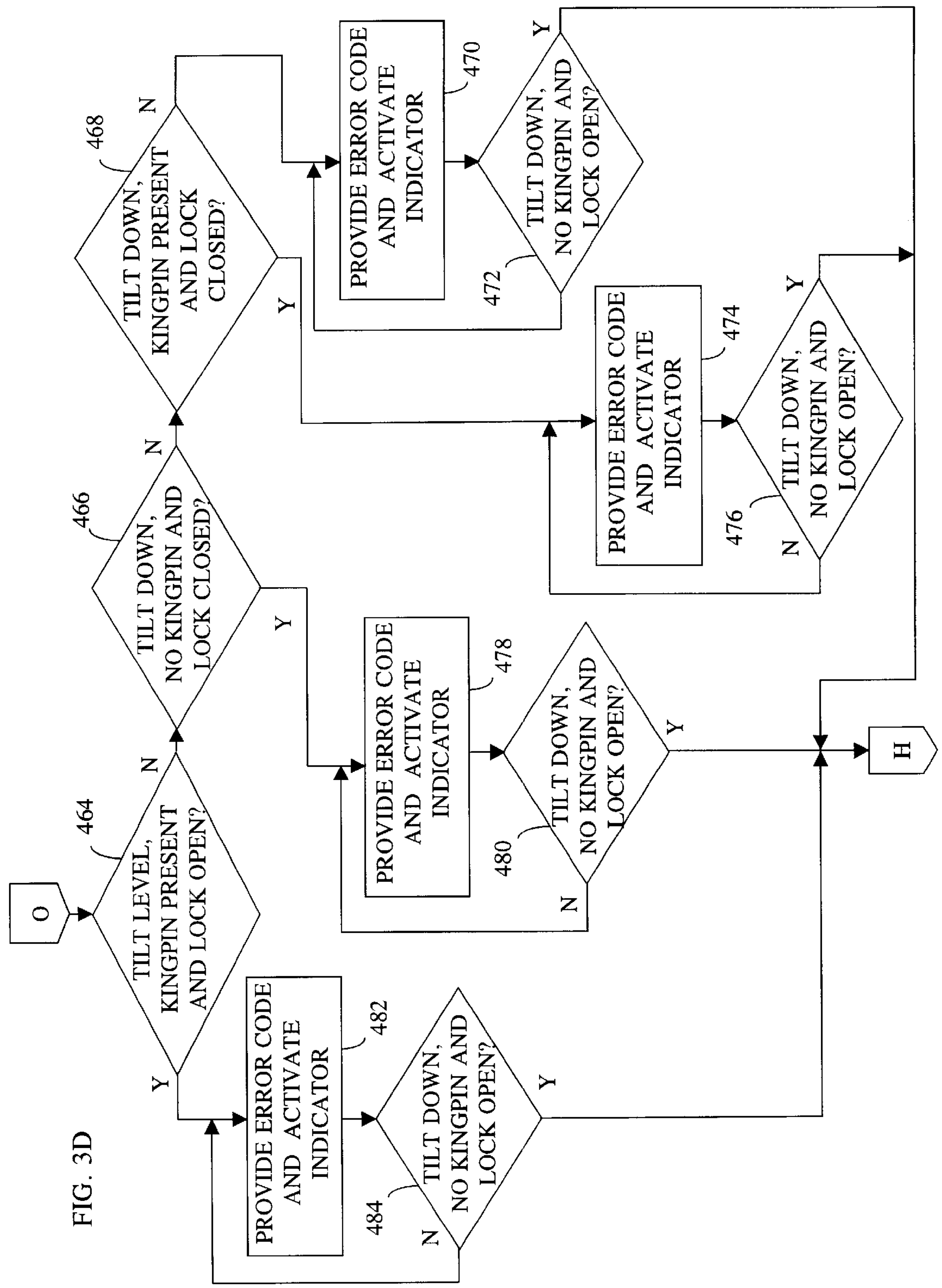
Figure 3E:
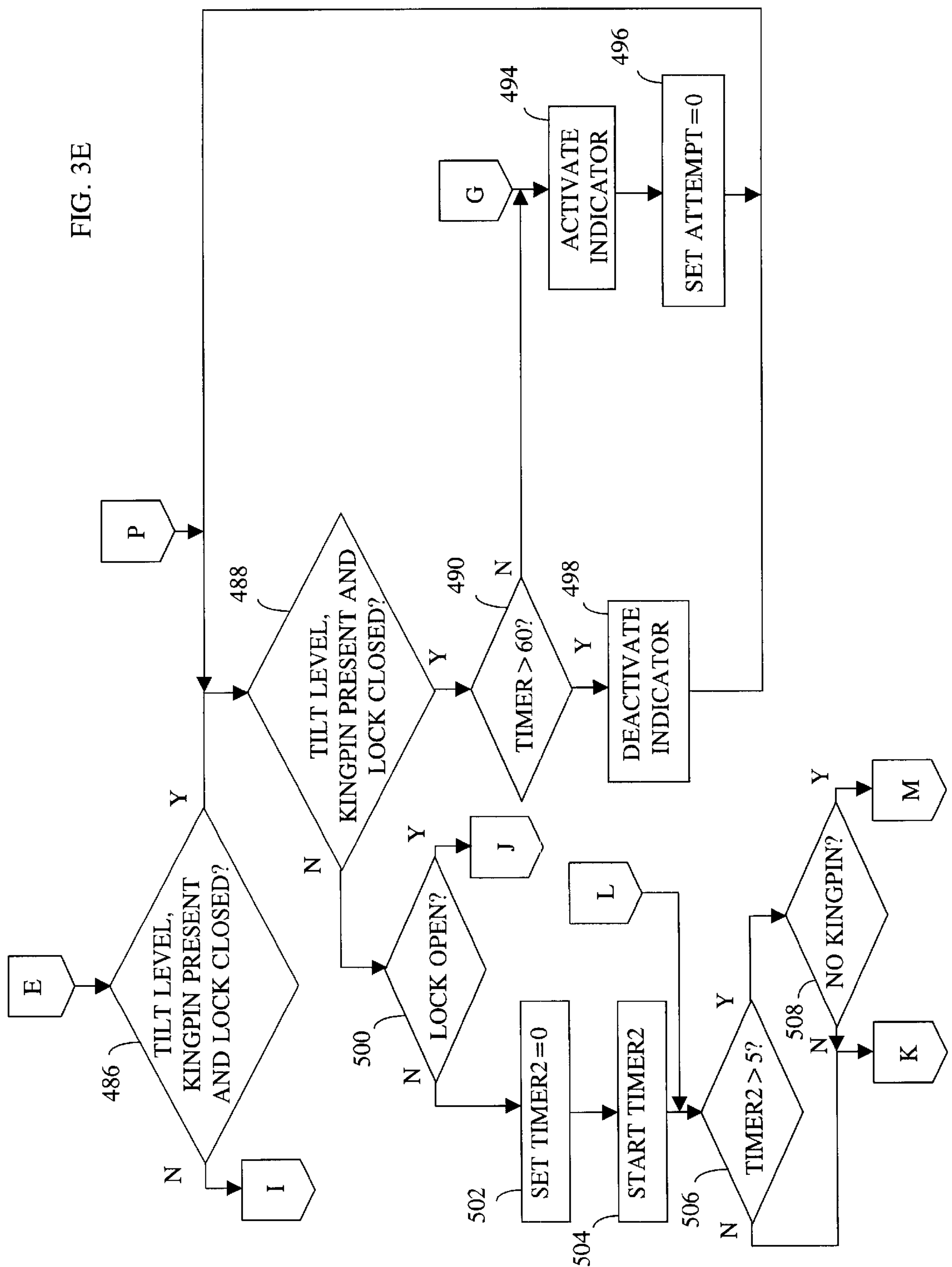
Figure 3F:
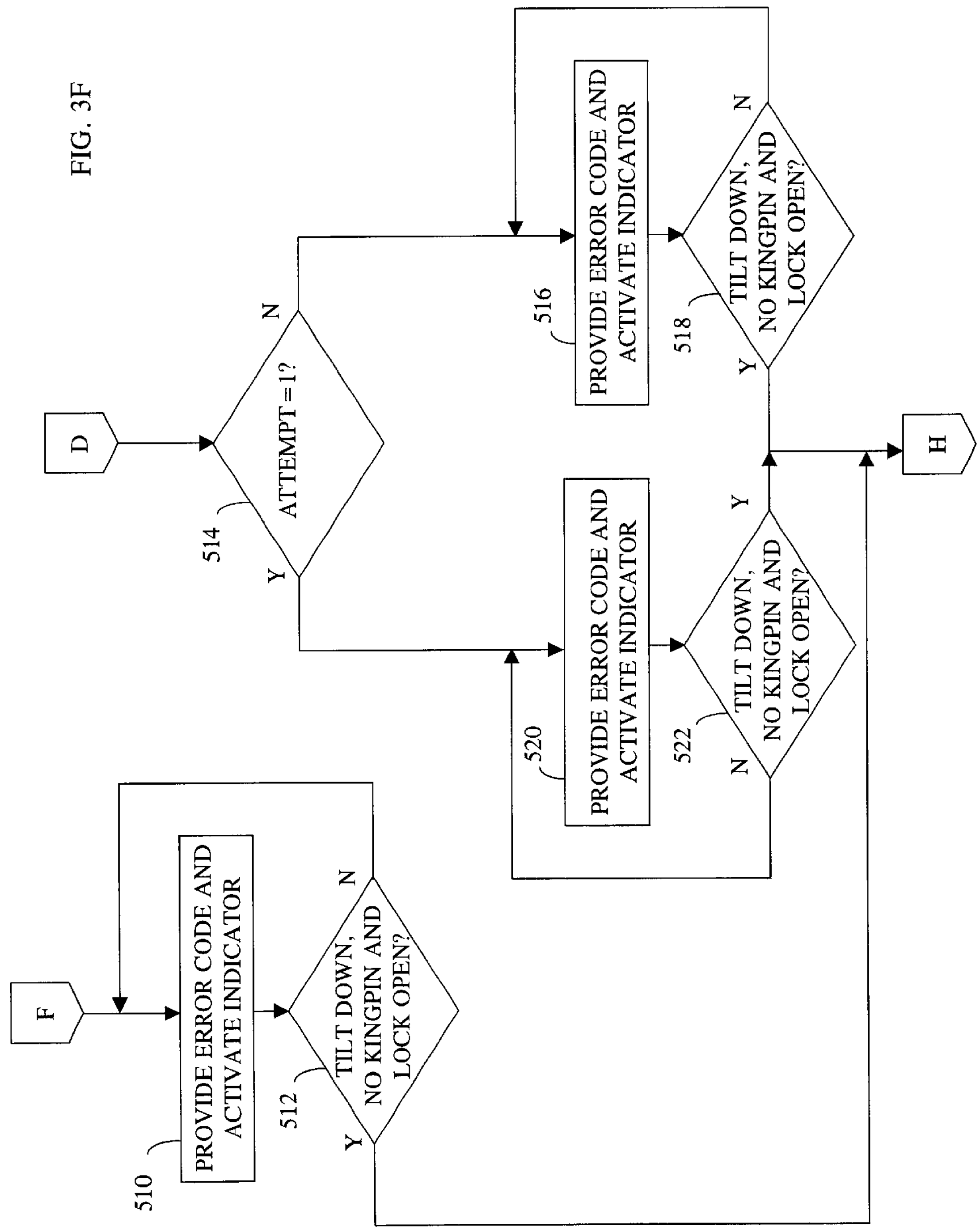
Figure 3G:
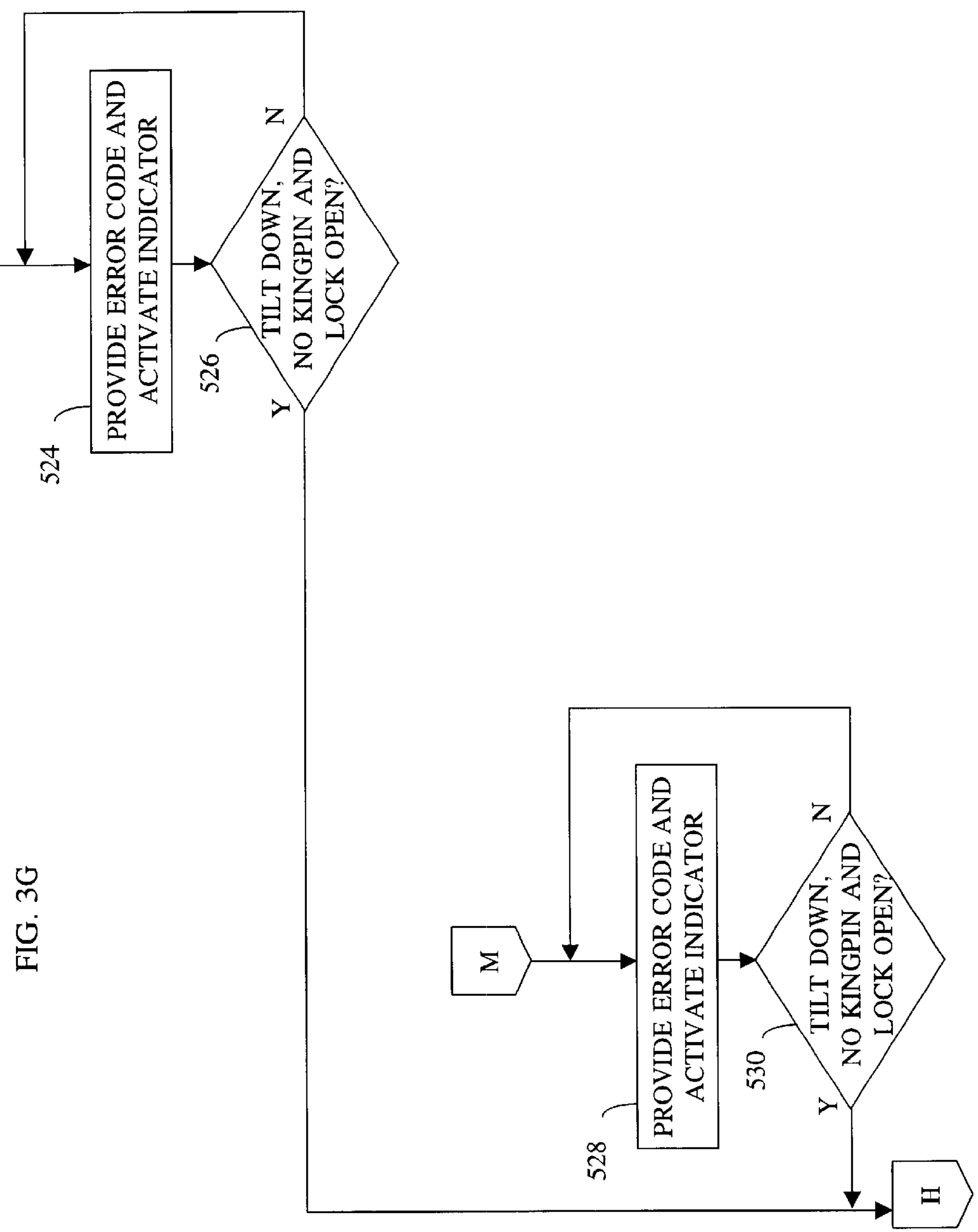
Figure 3H:
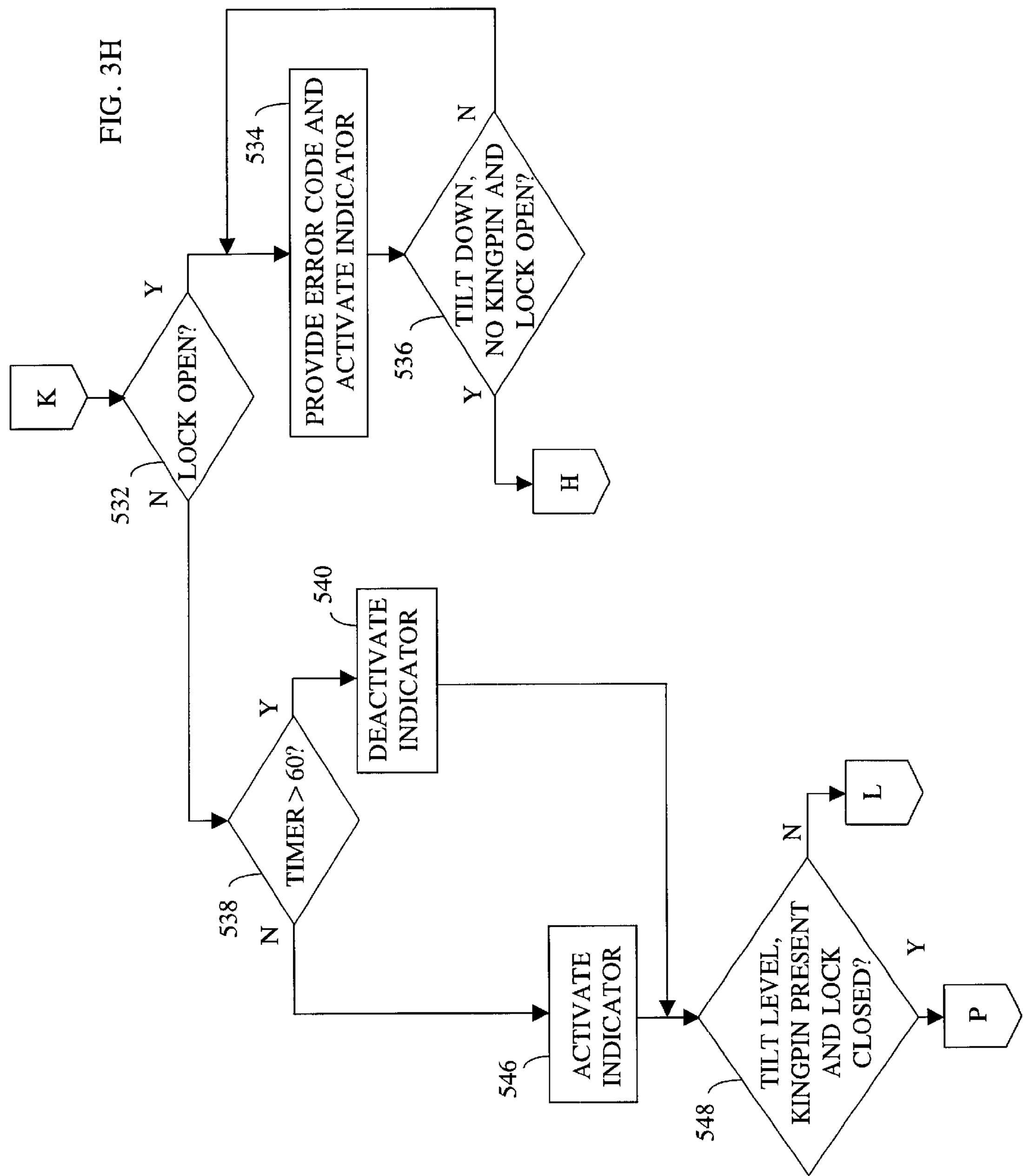
Figure 3I:
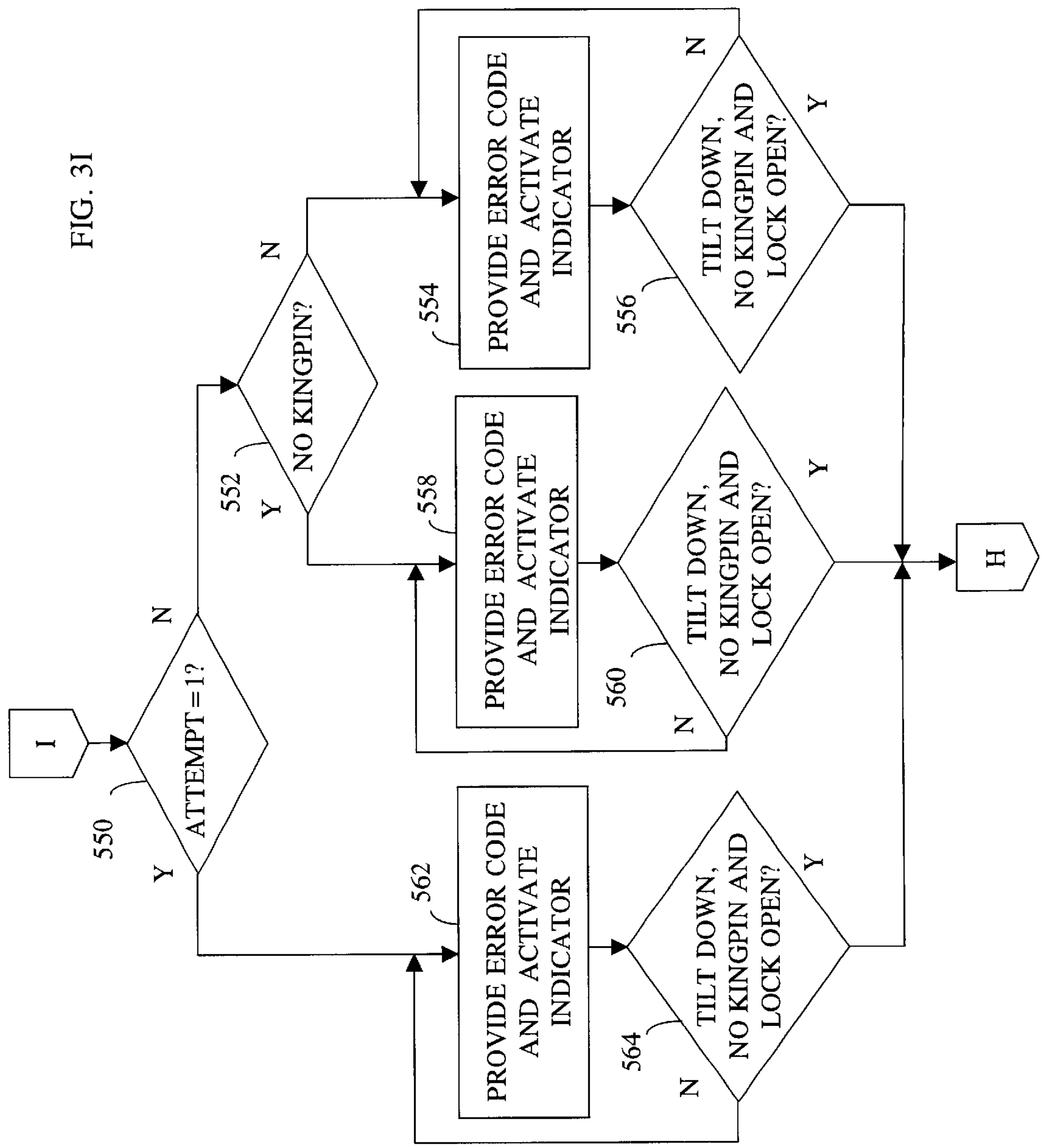
Figure 3J:
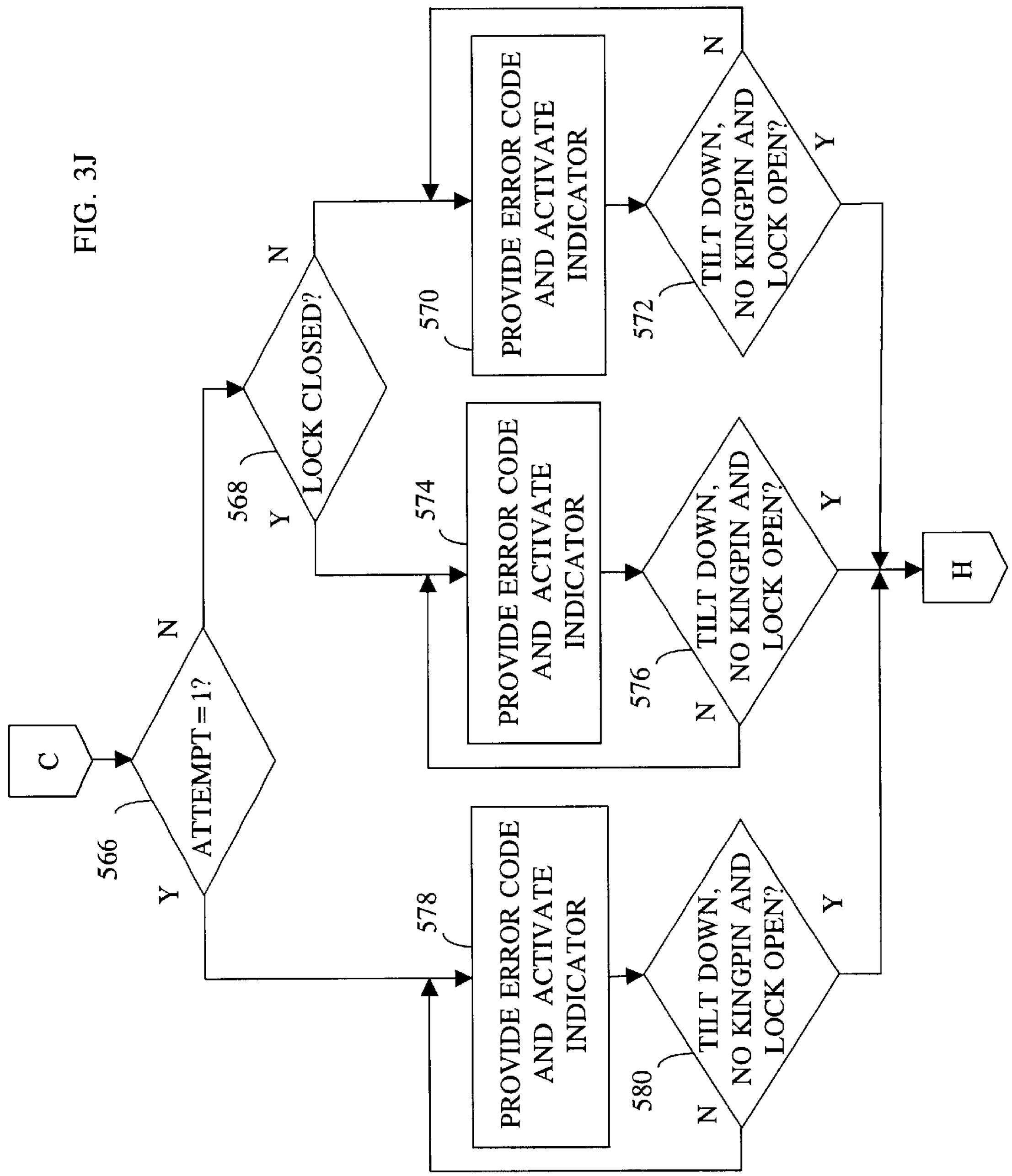

In step 432, processor 102 determines if the tilt is level, there is no kingpin present and the lock is open. If so, control transfers from step 432 to step 434. Otherwise, control transfers from step 432 to step 566 (FIG. 3J). In step 434, processor 102 determines if the tilt is level, there is no kingpin present and the lock is open. If not, control transfers to step 440. If the condition is true, control transfers from step 434 to step 438 where processor 102 activates (if not already active) the yellow fifth wheel indicator. From step 438, control returns to step 434. In step 440, processor 102 determines if the tilt is level, the kingpin is present and the lock is open. If so, control transfers from step 440 to step 442. Otherwise, control transfers from step 440 to step 514 (FIG. 3F).

In step 442, processor 102 initializes the first timer. Next, in step 444, processor 102 starts the first timer. Then, in step 446, processor 102 determines if the tilt is level, the kingpin is present and the lock is open. If so, control transfers from step 446 to step 450. Otherwise, control transfers from step 446 to step 486 (FIG. 3E). In step 450, processor 102 activates the yellow fifth wheel indicator, at which point control transfers to step 452. In step 452, processor 102 determines whether the first timer is greater than one second. If so, control transfers from step 452 to step 510. Otherwise, control transfers from step 452 to step 446.

In step 510 (FIG. 3F), processor 102 provides an appropriate error code (i.e., '8') and activates the red unlock indicator and the red fifth wheel indicator. An error code of '8' indicates that while the tilt is level and the kingpin is present, the lock did not close within one second. From step 510, control transfers to step 512. In step 512, processor 102 determines if the tilt is down, there is no kingpin present and the lock is open. If so, control transfers from step 512 to step 414. Otherwise, control returns to step 510.

In step 514, processor 102 determines if the "attempt" variable is equal to one. That is, if more than one unsuccessful attempt at coupling has already occurred. If the attempt is a first attempt, control transfers from step 514 to step 520. Otherwise, control transfers from step 514 to step 516. In step 516, processor 102 provides an appropriate error code (i.e., '4') and activates the red fifth wheel indicator. An error code of '4' indicates at a second attempt, the lock closed prior to the kingpin being present. Next, in step 518, processor 102 determines if the tilt is down, there is no kingpin present and the lock is open. If so, control transfers from step 518 to step 414. Otherwise, control returns to step 516.

In step 520, processor 102 provides an appropriate error code (i.e., '0') and activates the red fifth wheel indicator and may activate the red unlock indicator. An error code of '0' may indicate any error that occurred during a first coupling attempt. Next, control transfers to step 522 where processor 102 determines if the tilt is down, there is no kingpin present and the lock is open. If so, control transfers from step 522 to step 414. Otherwise, control transfers from step 522 to step 520.

In step 454 (FIG. 3C), processor 102 determines if the tilt is level, the kingpin is present and the lock is closed. If so, control transfers from step 454 to step 494 (FIG. 3E). Otherwise, control transfers from step 454 to step 456. In step 456, processor 102 determines if the tilt is level, there is no kingpin present and the lock is open. If so, control transfers from step 456 to step 463. Otherwise, control transfers from step 456 to step 458. In step 458, processor 102 determines if the tilt is level, there is no kingpin and the lock is closed. If so, control transfers from step 458 to step 460. Otherwise, control transfers from step 458 to step 464 (FIG. 3D).

In step 460, processor 102 provides an appropriate error code (i.e., '2') and activates the red fifth wheel indicator and may activate the red unlock indicator. An error code of '2' indicates that while the tilt is level and the lock is closed, the kingpin is not present. Next, control transfers to step 462 where processor 102 determines if the tilt is down, there is no kingpin present and the lock is open. If so, control transfers from step 462 to step 414. Otherwise, control transfers to step 460.

In step 463, processor 102 provides an appropriate error code (i.e., '1') and activates the red fifth wheel indicator and may activate the red unlock indicator. Next, in step 465, processor 102 determines if the tilt is down, there is no kingpin present and the lock is open. If so, control transfers from step 465 to step 414. Otherwise, control returns to step 463.

In step 464, processor 102 determines if the tilt is level, the kingpin is present and lock is open. If so, control transfers from step 464 to step 482. Otherwise, control transfers from step 464 to step 466. In step 466, processor 102 determines if the tilt is down, there is no kingpin present and the lock is closed. If so, control transfers to step 478. Otherwise, control transfers to step 468 where processor 102 determines if the tilt is down, the kingpin is present and the lock is closed. If so, control transfers from step 468 to step 474. Otherwise, control transfers from step 468 to step 470. In step 470, processor 102 provides an appropriate error code (i.e., '2') and activates the red fifth wheel indicator and may activate the red unlock indicator. Next, in step 470, processor 102 determines if the tilt is down, there is no kingpin and the lock is open. If so, control transfers to step 414. Otherwise, control returns to step 470.

In step 474, processor 102 provides an appropriate error code (i.e., '1') and activates the red fifth wheel indicator and may activate the red unlock indicator. From step 474, control transfers to step 476 where processor 102 determines if the tilt is down, there is no kingpin present and the lock is open. If so, control transfers from step 476 to step 414. Otherwise, control transfers from step 476 to step 474.

In step 478, processor 102 also provides an appropriate error code (i.e., '3') and activates the red fifth wheel indicator and may activate the red unlock indicator. Next, in step 480, processor 102 determines if the tilt is down, there is no kingpin present and the lock is open. If so, control transfers from step 480 to step 414. Otherwise, control returns to step 478. Likewise, in step 482, processor 102 provides an appropriate error code (i.e., '3') and activates the red fifth wheel indicator and may activate the red unlock indicator. Next, in step 484, processor 102 determines if the tilt is down, there is no kingpin and the lock is open. If so, control transfers from step 484 to step 414. Otherwise, control returns to step 482.

In step 486 (FIG. 3E), processor 102 determines if the tilt is level, the kingpin is present and the lock is closed. If so, control transfers from step 486 to step 488. Otherwise, control transfers to step 550 (FIG. 3I). In step 488, processor 102 determines if the tilt is still level, the kingpin is still present and the lock is still closed. If so, control transfers from step 488 to step 490. Otherwise, control transfers to step 500. In step 490, processor 102 determines if the first timer is greater than sixty seconds. If so, control transfers to step 498. Otherwise, control transfers from step 490 to step 494. In step 494, processor 102 activates the green lock indicator and the green fifth wheel indicator to indicate that proper coupling has been accomplished, at which point control transfers to step 496. In step 496, processor 102 initializes the "attempt" variable to zero and the process loops through steps 488–496 until the timer exceeds sixty seconds or the tilt, kingpin or lock status changes. In step 498, after the timer exceeds sixty seconds, processor 102 deactivates the green lock indicator and the green fifth wheel indicator, at which point control transfers to step 488.

In step 500, processor 102 determines if the lock is open. If so, control transfers to step 524 (FIG. 3G). Otherwise, control transfers to step 502. In step 502, processor 102 initializes a second timer to zero. Next, in step 504, processor 102 starts the second timer. Then, in step 506, processor 102 determines whether the second timer is greater than five seconds. If so, control transfers to step 508. Otherwise, control transfers to step 532 (FIG. 3H). In step 508, processor 102 determines if there is no kingpin present. If so, control transfers to step 528. Otherwise, control transfers from step 508 to step 532.

In step 528, processor 102 provides an appropriate error code (i.e., '7') and activates the red fifth wheel indicator and may activate the red unlock indicator. Next, in step 530, processor 102 determines if the tilt is down, there is no kingpin present and the lock is open. If so, control transfers from step 530 to step 414. Otherwise, control transfers to step 528. In step 524, processor 102 also provides an appropriate error code (i.e., '9') and activates the red unlock indicator and the red fifth wheel indicator. From that point, control transfers to step 526 where processor 102 determines if the tilt is down, there is no kingpin present and the lock is open. If so, control transfers from step 526 to step 414. Otherwise, control returns to step 524.

In step 532, processor 102 determines if the lock is open. If so, control transfers from step 532 to step 534. Otherwise, control transfers to step 538. In step 534, processor 102 provides an appropriate error code (i.e., '3') and activates the red fifth wheel indicator and may activate the red unlock indicator. Next, in step 536, processor 102 determines if the tilt is down, there is no kingpin present and the lock is open. If so, control transfers to step 414. Otherwise, control returns to step 534.

In step 538, processor 102 determines whether the first timer is greater than sixty seconds. If the first timer is not greater than sixty seconds, control transfers to step 546 where processor 102 activates the green lock indicator and the green fifth wheel indicator. Otherwise, control transfers to step 540 where processor 102 deactivates the green lock indicator and the green fifth wheel indicator. Next, in step 548, processor 102 determines if the tilt is level, the kingpin is present and the lock is closed. If so, control transfers to step 488. Otherwise, control transfers to step 506.

In step 550, processor 102 determines if the attempt at coupling is a first coupling attempt. If so, control transfers from step 550 to step 562. Otherwise, control transfers to step 552. In step 552, processor 102 determines if there is no kingpin present. If so, control transfers to step 558. If not, control transfers to step 554 where processor 102 provides an appropriate error code (i.e., '6') and activates the red fifth wheel indicator and may activate the red unlock indicator. An error code of '6' indicates that the hitch plate is not level. Next, control transfers to step 556 where processor 102 determines if the tilt is down, there is no kingpin and the lock is open. If so, control transfers to step 414. Otherwise, control returns to step 554.

In step 558, processor 102 provides an appropriate error code (i.e., '7') and activates the red fifth wheel indicator and may activate the red unlock indicator. An error code of '7' indicates that the kingpin is not present. Next, in step 560, processor 102 determines if the tilt is down, there is no kingpin present and the lock is open. If so, control transfers to step 414. Otherwise, control returns to step 558.

In step 562, processor 102 provides an appropriate error code (i.e., '0') and activates the red fifth wheel indicator and may activate the red unlock indicator. Next, in step 564, processor 102 determines if the tilt is down, there is no kingpin present and the lock is open. If so, control transfers to step 414. Otherwise, control transfers from step 564 to step 562.

In step 566, processor 102 determines if the attempt at coupling is a first coupling attempt. If so, control transfers from step 566 to step 578. Otherwise, control transfers from step 566 to step 568. In step 568, processor 102 determines if the lock is closed. If so, control transfers from step 568 to step 574. Otherwise, control transfers from step 568 to step 570. In steps 578, 574 and 570, processor 102 provides an appropriate error code (i.e., '0', '4' and '5', respectively) and activates the red fifth wheel indicator and may activate the red unlock indicator.

From step 578, control transfers to step 580. In step 580, processor 102 determines if the tilt is down, there is no kingpin present and the lock is open. If so, control transfers to step 414. Otherwise, control returns to step 578. From step 574, control transfers to step 576. In step 576, processor 102 determines if the tilt is down, there is no kingpin present and the lock is open. If so, control transfers to step 414. Otherwise, control returns to step 574. From step 570, control transfers to step 572. In step 572, processor 102 determines if the tilt is down, there is no kingpin and the lock is open. If so, control transfers to step 414. Otherwise, control returns to step 570. As previously stated, routine 400 runs continuously while power is supplied to the control circuit PCB.

Thus, a control circuit and two routines have been described that determine whether the trailer hitch assembly is properly coupled to the trailer by taking into account the sequence in which the trailer sensor and the lock sensor sense the respective positions of the trailer and locking mechanism, as well as, the time periods elapsing between the sensing of such positions.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed:

1. An electronic system for monitoring a trailer hitch assembly having a hitch plate with a throat for receiving a kingpin of a trailer and a locking mechanism for locking the kingpin in the throat, said system determining whether the trailer hitch assembly is properly coupled to the trailer, said system comprising:

- a trailer sensor for sensing the position of the trailer relative to said trailer hitch assembly;
- a lock sensor for sensing the position of the locking mechanism; and
- a control circuit coupled to said trailer sensor and said lock sensor, said control circuit determining whether the trailer hitch assembly is properly coupled to the trailer by taking into account the sequence in which said trailer sensor and said lock sensor sense the respective positions of the trailer and the locking mechanism as well as the time period elapsing between the sensing of such positions.

2. The system of claim 1, wherein the trailer sensor is a kingpin sensor that senses the position of the kingpin relative to said throat.

3. The system of claim 1, wherein the trailer sensor is a tilt sensor that senses the tilt of the hitch plate.

4. The system of claim 1, wherein the trailer sensor includes a kingpin sensor that senses the position of the kingpin relative to said throat and a tilt sensor that senses the tilt of the hitch plate.

5. The system of claim 1, further including:

a display device coupled to the control circuit, said display device displaying coupling status information to a driver of the vehicle.

6. The system of claim 5, wherein the coupling status information includes an error code indicating possible sources of a coupling malfunction.

7. The system of claim 5, further including:

a memory device for storing coupling status information, said coupling status information including a history of changes in position of the trailer and the locking mechanism as respectively sensed by said trailer sensor and said lock sensor.

8. An electronic system for monitoring a trailer hitch assembly mounted on a vehicle, the trailer hitch assembly having a hitch plate with a throat for receiving a kingpin of a trailer and a locking mechanism for locking the kingpin in the throat, said system comprising:

a trailer sensor for sensing the position of the trailer relative to said trailer hitch assembly;

a lock sensor for sensing the position of the locking mechanism;

an output device for providing coupling status information to a driver of the vehicle; and a control circuit coupled to said trailer sensor, said lock sensor and said output device, said control circuit providing an alphanumeric error code through the output device when said trailer sensor and said lock sensor indicate that the trailer hitch assembly is not properly coupled to the trailer.

9. The system of claim 8, wherein said control circuit determines a potential cause of the improper coupling by taking into account the sequence in which said trailer sensor and said lock sensor sense the respective positions of the trailer and the locking mechanism as well as the time period elapsing between the sensing of such positions.

10. The system of claim 8, wherein the output device includes a plurality of light emitting diodes (LEDs) and a seven segment display.

11. The system of claim 8, wherein the trailer sensor is a kingpin sensor that senses the position of the kingpin relative to said throat.

12. The system of claim 8, wherein the trailer sensor is a tilt sensor that senses the tilt of the hitch plate.

13. The system of claim 8, wherein the trailer sensor includes a kingpin sensor that senses the position of the kingpin relative to said throat and a tilt sensor that senses the tilt of the hitch plate.

14. An electronic system for monitoring a trailer hitch assembly mounted on a vehicle, the trailer hitch assembly having a hitch plate with a throat for receiving a kingpin of a trailer and a locking mechanism for locking the kingpin in the throat, said system comprising:

a trailer sensor for sensing the position of the trailer relative to said trailer hitch assembly;

a lock sensor for sensing the position of the locking mechanism;

a memory device for storing coupling status information; and a control circuit coupled to said trailer sensor, said lock sensor, and said memory device for sequentially storing in said memory device, a history of changes in position of the trailer and the locking mechanism as respectively sensed by said trailer sensor and said lock sensor.

15. The system of claim 14, wherein said memory device is an EEPROM.

16. The system of claim 14, wherein the trailer sensor is a kingpin sensor that senses the position of the kingpin relative to said throat.

17. The system of claim 14, wherein the trailer sensor is a tilt sensor that senses the tilt of the hitch plate.

18. The system of claim 14, wherein the trailer sensor includes a kingpin sensor that senses the position of the kingpin relative to said throat and a tilt sensor that senses the tilt of the hitch plate.

19. The system of claim 14, further including:

a display device coupled to the control circuit, said display device displaying coupling status information to a driver of the vehicle.

20. The system of claim 19, wherein the coupling status information includes an error code indicating possible sources of a coupling malfunction.

21. An electronic system for monitoring a trailer hitch assembly having a hitch plate with a throat for receiving a kingpin of a trailer and a locking mechanism for locking the kingpin in the throat, said system determining whether the trailer hitch assembly is properly coupled to the trailer, said system comprising:

a trailer sensor for sensing the position of the trailer relative to said trailer hitch assembly;

a lock sensor for sensing the position of the locking mechanism; and a control circuit coupled to said trailer sensor and said lock sensor, said control circuit determining whether the trailer hitch assembly is properly coupled to the trailer by taking into account the time period elapsing between when said trailer sensor and said lock sensor sense the respective positions of the trailer and the locking mechanism.

22. The system of claim 21, wherein the kingpin sensor is in a plane below the locking mechanism.

23. A hitching system, comprising:

a trailer hitch assembly having a hitch plate with a throat for receiving a kingpin of a trailer and a locking mechanism for locking the kingpin in the throat;

a trailer sensor for sensing the position of the trailer relative to said trailer hitch assembly;

a lock sensor for sensing the position of the locking mechanism; and a control circuit coupled to said trailer sensor and said lock sensor, said control circuit determining whether the trailer hitch assembly is properly coupled to the trailer by taking into account the sequence in which said trailer sensor and said lock sensor sense the respective positions of the trailer and the locking mechanism as well as the time period elapsing between the sensing of such positions.

24. The system of claim 23, wherein the trailer sensor is a kingpin sensor that senses the position of the kingpin relative to said throat.

25. The system of claim 23, wherein the trailer sensor is a tilt sensor that senses the tilt of the hitch plate.

26. The system of claim 23, wherein the trailer sensor includes a kingpin sensor that senses the position of the kingpin relative to said throat and a tilt sensor that senses the tilt of the hitch plate.

27. The system of claim 23, further including:

a display device coupled to the control circuit, said display device displaying coupling status information to a driver of the vehicle.

28. The system of claim 27, wherein the coupling status information includes an error code indicating possible sources of a coupling malfunction.

29. The system of claim 27, further including:

a memory device for storing coupling status information, said coupling status information including a history of changes in position of the trailer and the locking mechanism as respectively sensed by said trailer sensor and said lock sensor.

30. The system of claim 29, wherein the memory device includes a FIFO buffer for storing the history of changes in position of the trailer and the locking mechanism as respectively sensed by said trailer sensor and said lock sensor.

* * * * *

UNITED STATES PATENT AND TRADEMARK OFFICE

CERTIFICATE OF CORRECTION

PATENT NO. : 6,285,278 B1
DATED : September 4, 2001
INVENTOR(S) : Schutt et al.

It is certified that error appears in the above-identified patent and that said Letters Patent is hereby corrected as shown below:

Title page,
Item [75], Inventors: "Randy L. Schutt; Steven C. Dupay, both of Holland, Michael H. Ginocchio, Grand Haven, all of MI (US)" should be -- Randy L. Schutt; Steven C. Dupay; Kurt A. Dykema, all of Holland, Michael H. Ginocchio, Grand Haven, all of MI (US) --

Columns 9 and 10,
Table 2, Error Code 5, under DESCRIPTION: "tile" should be -- tilt --.

Signed and Sealed this

Twenty-third Day of December, 2003

JAMES E. ROGAN
*Director of the United States Patent and Trademark Office*